US008720950B2

(12) United States Patent
Tomita et al.

(10) Patent No.: US 8,720,950 B2
(45) Date of Patent: May 13, 2014

(54) PRETENSIONER, SEATBELT RETRACTOR INCLUDING THE PRETENSIONER, AND SEATBELT APPARATUS INCLUDING THE SEATBELT RETRACTOR

(75) Inventors: Hiroshi Tomita, Tokyo (JP); Yuichiro Hodatsu, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/518,581

(22) PCT Filed: Dec. 24, 2010

(86) PCT No.: PCT/JP2010/007512
§ 371 (c)(1),
(2), (4) Date: Jun. 22, 2012

(87) PCT Pub. No.: WO2011/077749
PCT Pub. Date: Jun. 30, 2011

(65) Prior Publication Data
US 2012/0256407 A1 Oct. 11, 2012

(30) Foreign Application Priority Data
Dec. 25, 2009 (JP) .................................. 2009-295367

(51) Int. Cl.
*B60R 22/36* (2006.01)
*B60R 22/46* (2006.01)

(52) U.S. Cl.
USPC ............................. 280/806; 280/807; 297/476

(58) Field of Classification Search
USPC .................. 280/806, 807; 297/476, 475, 480; 242/374
See application file for complete search history.

(56) References Cited

U.S. PATENT DOCUMENTS

| 6,343,522 | B1 | 2/2002 | Hori et al. |
| 7,631,831 | B2 * | 12/2009 | Hiramatsu ..................... 242/374 |
| 8,371,613 | B2 * | 2/2013 | Hodatsu et al. ............... 280/806 |
| 2005/0151364 | A1 | 7/2005 | Kameda et al. |
| 2007/0241550 | A1 | 10/2007 | Bieg et al. |

(Continued)

FOREIGN PATENT DOCUMENTS

| CN | 101070061 A | 11/2007 |
| DE | 10 2006 045 198 A1 | 4/2008 |

(Continued)

OTHER PUBLICATIONS

International Search Report PCT/JP2010/007512 dated Feb. 1, 2011.

(Continued)

*Primary Examiner* — Karen Beck
(74) *Attorney, Agent, or Firm* — Foley & Lardner LLP

(57) ABSTRACT

A ring gear 15 of a pretensioner 8 includes a plurality of levers 17 and one arc-shaped stopper 16 to allow force transmission members to smoothly move in a pipe, to facilitate setting of a stopper for stopping rotation of a ring gear, and to reduce the cost with a simple structure. During operation of the pretensioner 8, the levers 17 are sequentially pressed by balls 12a to rotate a pinion 19 and a spool in a seatbelt retracting direction. When the ring gear 15 rotates by a predetermined rotation amount, an outer peripheral edge 16c of the stopper 16 contacts and presses the opposing ball 12a. Since the ball 12a is thereby clamped between the stopper 16 and an inner peripheral surface 10d1 of a pipe 10, the ring gear 15 is stopped.

11 Claims, 18 Drawing Sheets

(56) References Cited

U.S. PATENT DOCUMENTS

| | | |
|---|---|---|
| 2007/0262186 A1 | 11/2007 | Hiramatsu |
| 2010/0084906 A1* | 4/2010 | Burrow et al. .............. 297/476 |
| 2012/0146319 A1* | 6/2012 | Hodatsu et al. ............. 280/806 |
| 2012/0212030 A1* | 8/2012 | Hodatsu et al. ............. 297/480 |
| 2012/0256407 A1* | 10/2012 | Tomita et al. ............... 280/806 |

FOREIGN PATENT DOCUMENTS

| | | |
|---|---|---|
| DE | 10 2006 047 669 A1 | 4/2008 |
| EP | 1 854 682 A1 | 11/2007 |
| GB | 2 379 424 A | 3/2003 |
| JP | 11-314558 | 11/1999 |
| JP | 2000-225920 A | 8/2000 |
| JP | 2000-309250 A | 11/2000 |
| JP | 2001-233172 | 8/2001 |
| JP | 2007-522030 A | 8/2007 |
| JP | 2007-302074 | 11/2007 |
| JP | 2007-302074 A | 11/2007 |
| WO | WO 2005/054016 A1 | 6/2005 |
| WO | WO 2005/080150 A1 | 9/2005 |

OTHER PUBLICATIONS

Supplementary European Search Report EP 10 83 8987 dated Apr. 24, 2013.
Notice of Rejection; JP No. 2011-547327; Sep. 18, 2013; 2 pgs.
Notice of Rejection dated Mar. 5, 2014 issued in connection with Chinese Application No. 201080059208.0.

* cited by examiner (a)

(b)

(b)

(a)

(a)

(b)

(a)

(b)

(b)

(a)

(c)

PRETENSIONER, SEATBELT RETRACTOR INCLUDING THE PRETENSIONER, AND SEATBELT APPARATUS INCLUDING THE SEATBELT RETRACTOR

TECHNICAL FIELD

The present invention relates to a technical field of a pretensioner provided in a seatbelt retractor for retracting a seatbelt and using a plurality of force transmission members such as balls, a technical field of a seatbelt retractor, and a technical field of a vehicle seatbelt apparatus.

BACKGROUND ART

For seatbelt apparatuses to be mounted in vehicles such as cars, various seatbelt retractors including a pretensioner have been developed. In an initial stage of an emergency, such as a vehicle collision, when a deceleration higher than the normal deceleration is applied to the vehicle, this pretensioner rotates a spool of a seatbelt retractor in a seatbelt retracting direction by using reaction gas generated by a gas generator, thereby retracting a seatbelt around the spool. This quickly removes slack from the seatbelt and applies tension to the seatbelt so as to increase the occupant restraint force.

As an example of a pretensioner of the related art, there is known a pretensioner in which a plurality of force transmission members formed by balls are stored in a pipe. In case of an emergency, these force transmission members are moved along the interior of the pipe by receiving gas pressure of reaction gas, and press a plurality of pressed portions of a ring gear. A spool is rotated by the ring gear in a seatbelt retracting direction (for example, see PTL 1).

In the pretensioner described in PTL 1, the balls, whose rotating forces are substantially lost after the completion of the rotation of the ring gear, come out from a cutout portion of the pipe, separate from the ring gear, and are received in a special ball storage chamber provided in the pretensioner. When the ball storage chamber is thus provided, the size of the pretensioner is increased, and the size of the seatbelt retractor is inevitably increased.

Since the balls are stored in the ball storage chamber, the number of balls is relatively large, and the length of the expensive pipe is large. This increases the cost of the pretensioner of the related art. Moreover, since the length of the pipe needs to be long to a certain extent, a gas generator is forced to be provided on a lower side of the seatbelt retractor. This complicates a mounting operation of the gas generator. If the gas generator is forcibly provided on an upper side of the seatbelt retractor, routing of the pipe is difficult, and the size of the seatbelt retractor increases.

In contrast, there is known a pretensioner in which a plurality of pressed portions of a ring gear are sequentially pressed by a plurality balls serving as mass bodies to rotate the ring gear. The balls, whose rotating forces are substantially lost after the completion of the rotation of the ring gear, are received between adjacent pressed portions of the ring gear and are moved along with the rotation of the ring gear (for example, see PTL 2).

In the pretensioner described in PTL 2, since the balls are received in recesses provided between the adjacent pressed portions of the ring gear, there is no need to form a special ball storage chamber in the pretensioner. Therefore, this pretensioner does not have the above-described problem of the pretensioner described in PTL 1.

CITATION LIST

Patent Literature

PTL 1: Japanese Unexamined Patent Application Publication No. 2001-233172
PTL 2: Japanese Unexamined Patent Application Publication (Translation of PCT Application) No. 2007-522030

SUMMARY OF INVENTION

Technical Problem

In the above-described example of the pretensioner described in PTL 2, when the ring gear rotates by a predetermined rotation amount, a leading ball that first presses the pressed portion of the ring gear comes into contact with a stopper provided in a case body. Thus, the rotation of the ring gear stops, and retraction of the seatbelt by the action of the pretensioner finishes. At this time, a predetermined tension is applied to the seatbelt and restrains the occupant. Further, at this time, a driving piston for pressing the balls is prevented from coming out from the pipe, but the driving piston remains in the pipe.

However, in the example of the pretensioner described in PTL 2, the leading ball directly collides with the platelike stopper. When the ball thus directly collides with the stopper, a great impact force is applied from the ball to the stopper. For this reason, the strength of the stopper needs to be set at a strength that can counteract a great impact force. Therefore, not only the stopper is forced to have a large size, but also the large stopper must be set in a relatively narrow limited space. Hence, it is difficult to set the stopper, and the structure of the case body is complicated. This increases the cost of the pretensioner.

In another example of a pretensioner described in PTL 2, a last pair of balls adjacent to a piston are connected by a bridge, and the bridge is pressed by a tooth between a pair of adjacent recesses in the ring gear, so that the rotation of the ring gear is stopped. That is, the tooth between the pair of recesses in the ring gear also functions as a stopper provided in the ring gear.

However, in this example of the pretensioner described in PTL 2, since the last pair of balls are connected by the bridge, they have difficulty in smoothly moving in the pipe. Particularly when the pipe is curved in various forms, the balls have a greater difficulty in smoothly moving in the pipe.

A pointed tip of the tooth of the ring gear comes into contact with the bridge for connecting the last pair of balls with a great impact force. Accordingly, it is necessary not only to increase the size of the bridge for greater strength but also to increase the connection strength of the bridge for the pair of balls. For this reason, not only a connection structure for the pair of balls is complicated, but also a production process for the pretensioner becomes troublesome. This increases the cost of the pretensioner.

The present invention has been made in view of these circumstances, and an object of the invention is to provide a pretensioner that allows force transmission members to more smoothly move in a pipe, can facilitate setting of a stopper for stopping rotation of a ring gear, and can further reduce the cost with a simple structure, a seatbelt retractor including the pretensioner, and a seatbelt apparatus including the seatbelt retractor.

Solution to Problem

To overcome the above-described problems, a pretensioner according to the present invention includes: a pipe; a plurality of force transmission members provided movably in the pipe to transmit a force for rotating a spool in a seatbelt retracting direction; a gas generator that generates gas in case of an emergency; a ring gear at least rotatably provided and including a plurality of internal teeth on an inner periphery and a plurality of pressed portions on an outer periphery; and a pinion provided in a spool-side member to rotate the spool and including external teeth to be meshed with the internal teeth. In case of the emergency, the force transmission members press the pressed portions of the ring gear to rotate the spool in the seatbelt retracting direction. The ring gear includes a stopper that stops rotation of the ring gear by contact with at least one of the force transmission members when the ring gear is rotated by a predetermined rotation amount by being pressed by the force transmission members.

A pretensioner according to the present invention includes: a pipe; a plurality of force transmission members provided movably in the pipe to transmit a force for rotating a spool in a seatbelt retracting direction; a gas generator that generates gas in case of an emergency; a ring gear at least rotatably provided and including a plurality of internal teeth on an inner periphery and a plurality of pressed portions on an outer periphery; and a pinion provided in a spool-side member to rotate the spool and including external teeth to be meshed with the internal teeth. In case of the emergency, the force transmission members press the pressed portions of the ring gear to rotate the spool in the seatbelt retracting direction. The ring gear includes a stopper that stops rotation of the ring gear by contact with the pipe when the ring gear is rotated by a predetermined rotation amount by being pressed by the force transmission members.

The pretensioner according to the present invention further includes: a case body; and a second stopper that is provided in the case body and is deformed by contact with the first one of the force transmission members before the stopper contacts with at least one of the force transmission members or the pipe.

Further, in the pretensioner according to the present invention, the force transmission members are balls.

A seatbelt retractor according to the present invention includes at least: a seatbelt; a spool that retracts the seatbelt, and a pretensioner that rotates the spool in a seatbelt retracting direction in case of an emergency. The pretensioner is any one of the above-described pretensioners of the present invention.

A seatbelt apparatus according to the present invention includes at least: a seatbelt retractor that retracts the seatbelt, a tongue slidably supported by the seatbelt; and a buckle provided in a vehicle body to disengageably retain the tongue. The seatbelt retractor is the above-described seatbelt retractor of the present invention.

Advantageous Effects of Invention

According to the pretensioner and the seatbelt retractor of the present invention having these features, when the ring gear rotates by a predetermined rotation amount in the seatbelt retracting direction, the stopper provided in the ring gear comes into contact with the opposing force transmission member or pipe. This contact of the stopper with the force transmission member or the pipe can effectively stop the rotation of the ring gear.

Since the stopper provided in the ring gear directly presses the force transmission member or the pipe, it is unnecessary to connect a pair of force transmission members by a connecting member such as a bridge, unlike the above-described example of the pretensioner described in PTL 2. Therefore, a connecting structure for the pair of force transmission members can be eliminated. Thus, a stopper structure including the stopper and the force transmission member is simplified, and the stopper structure does not need to be large. As a result, the stopper structure formed by the stopper, and the force transmission member or the pipe can be easily set in a limited space in the case body. This can suppress the increase in cost of the pretensioner.

Since it is unnecessary to connect the pair of force transmission members by the connecting member such as a bridge, all force transmission members can be smoothly moved in the pipe. Particularly when the force transmission members are formed by balls, they can be more smoothly moved in the pipe. Moreover, since the connecting structure for the pair of force transmission members is unnecessary, the production process for the pretensioner is simplified, and the cost of the pretensioner can be reduced more effectively.

According to the pretensioner and the seatbelt retractor of the present invention, before the rotation of the ring gear is stopped by the stopper of the ring gear, the first force transmission member comes into contact with the second stopper provided in the case body, and deforms the second stopper in the case body. Hence, kinetic energy of the force transmission members is absorbed. This reduces the impact caused when the stopper of the ring gear contacts with the force transmission member. Therefore, the rotation of the ring gear can be more effectively stopped by the press of the stopper of the ring gear on the force transmission member.

According to the seatbelt apparatus including the seatbelt retractor of the present invention, the rotation of the ring gear can be effectively stopped by the contact of the stopper on the force transmission member or the pipe. This can enhance the occupant restraint performance of the seatbelt using the action of the pretensioner.

DESCRIPTION OF EMBODIMENTS

Embodiments of the present invention will be described below with reference to the drawings.

Figure 1:
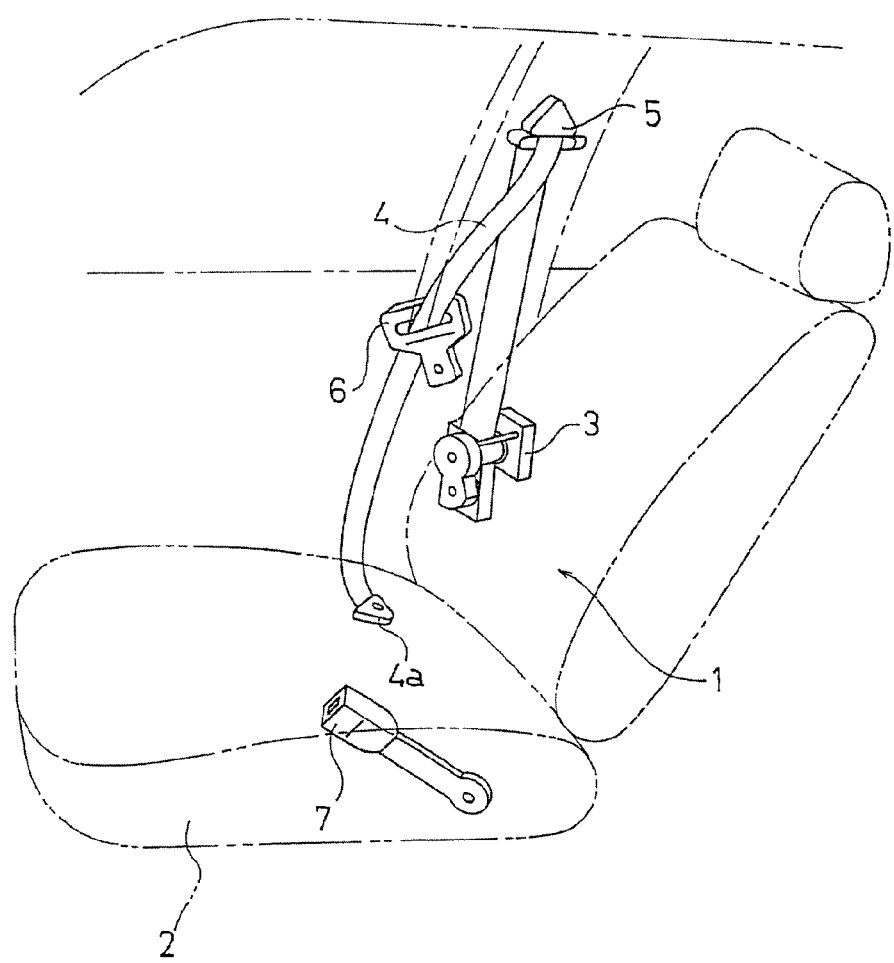
FIG. 1 schematically illustrates a seatbelt apparatus including a seatbelt retractor according to a first embodiment of the present invention.

FIG. 1 schematically illustrates a seatbelt apparatus including a seatbelt retractor according to a first embodiment of the present invention.

As illustrated in FIG. 1, a seatbelt apparatus 1 of the first embodiment is basically the same as a known three-point type seatbelt apparatus. In the figure, reference numeral 1 denotes a seatbelt apparatus, reference numeral 2 denotes a vehicle seat, reference numeral 3 denotes a seatbelt retractor provided near the vehicle seat 2, and reference numeral 4 denotes a seatbelt that is withdrawably retracted by the seatbelt retractor 3 and that has at its tip a belt anchor 4a fixed to the floor of the vehicle body or the vehicle seat 2. Reference numeral 5 denotes a guide anchor that guides the seatbelt 4 withdrawn from the seatbelt retractor 3 toward the shoulder of an occupant, reference numeral 6 denotes a tongue slidably supported by the seatbelt 4 guided from the guide anchor 5, and reference numeral 7 denotes a buckle fixed to the floor of the vehicle body or the vehicle seat in a manner such that the tongue 6 is engageably and disengageably inserted in and engaged with the buckle 7.

Operations of fastening and unfastening the seatbelt 4 in the seatbelt apparatus 1 are identical to those adopted in known seatbelt apparatuses.

The seatbelt retractor 3 of the first embodiment is a known emergency locking seatbelt retractor (ELR) or a known automatic locking seatbelt retractor (ALR). The seatbelt retractor 3 includes a pretensioner. Similarly to known pretensioners, this pretensioner starts operation in case of an emergency when a deceleration much higher than the deceleration in a normal running state is applied, for example, in a vehicle collision, rotates a spool (the same as a spool denoted by reference numeral 29 in a below-described fifth embodiment illustrated in FIG. 12) of the seatbelt retractor 3 in a seatbelt retracting direction, and retracts the seatbelt 4 by a predetermined amount, thereby increasing the occupant restraint force.

Figure 2:
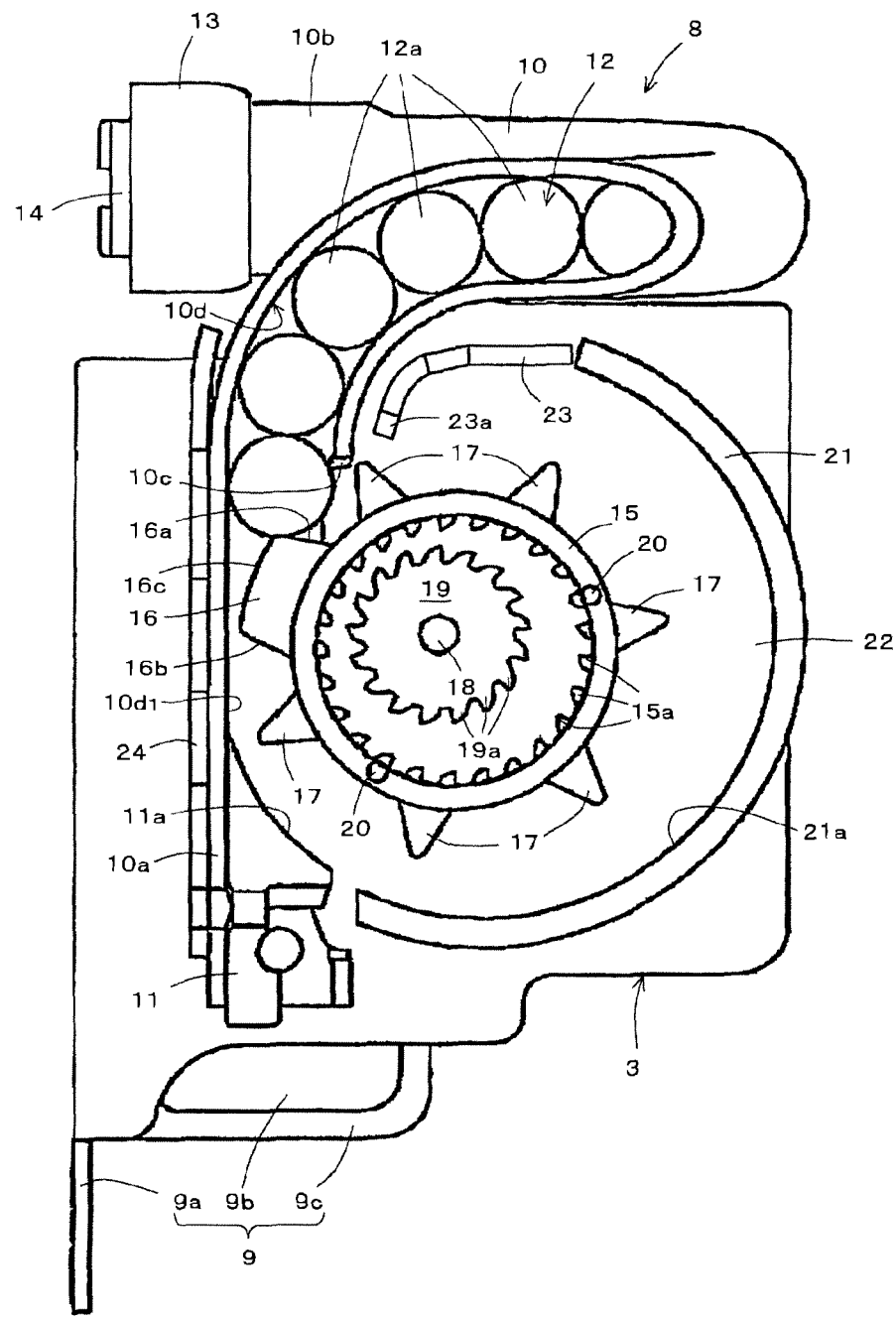
FIG. 2 is a partially cutaway side view of the seatbelt retractor including a pretensioner according to the first embodiment illustrated in FIG. 1.

FIG. 2 is a partially cutaway side view of the seatbelt retractor including the pretensioner of the first embodiment.

As illustrated in FIG. 2, a pretensioner 8 of the first embodiment is supported by a frame 9 of the seatbelt retractor 3. The frame 9 includes a base portion 9a located on an inner side of the vehicle cabin (left side in FIG. 2) and mounted on the vehicle body, and a pair of side walls 9b and 9c bent from the base portion 9a.

The pretensioner 8 includes a pipe 10, and a guide member 11 is provided at a distal end portion 10a of the pipe 10. In the distal end portion 10a of the pipe 10, a cutout portion 10c that communicates between the interior and exterior of the pipe 10 and extends in a longitudinal direction of the pipe 10 is provided.

The distal end portion 10a of the pipe 10 and the guide member 11 are mounted by appropriate fixing members, such as bolts, on a pipe mount portion 24 fixed to the side wall 9b. In this case, a side of the distal end portion 10a of the pipe 10 opposing the cutout portion 10c is mounted on the pipe mount portion 24.

In the pipe 10, a plurality of force transmission members 12 including a plurality of balls 12a formed of metal, such as iron or aluminum, and an unillustrated piston for pressing the balls 12a with received gas pressure are movably provided in contact with each other. A pipe-shaped pressure vessel 13 is connected to a base end portion 10b of the pipe 10. The pressure vessel 13 is provided with a gas generator 14.

The pretensioner 8 includes a case body (although not illustrated in the first embodiment, the case body is the same as a case body of a below-described fifth embodiment denoted by reference numeral 27 in FIG. 12), and the case body is mounted on the side wall 9b. In the case body, a ring gear 15 is provided rotatably and movably to the right in FIG. 2. The ring gear 15 has a plurality of internal teeth 15a on its inner peripheral surface. A part of the ring gear 15 can enter the pipe 10 through the cutout portion 10c provided in the distal end portion 10a of the pipe 10.

One substantially arc-shaped stopper 16 (corresponding to a pressed portion of the present invention) and a plurality of (six in the illustrated embodiment) substantially triangular levers 17 (corresponding to a pressed portion of the present invention) project from an outer peripheral surface of the ring gear 15. The stopper 16 includes an outer peripheral edge portion 16c which has a predetermined length in a circumferential direction and with which the first (leading) ball 12a contacts in a normal state (in a non-operation state of the pretensioner 8). In this case, a distance in the circumferential direction between one circumferential end of the stopper 16 and a lever 17 adjacent to the one circumferential end and a distance in the circumferential direction between the other circumferential end of the stopper 16 and a lever 17 adjacent to the other circumferential end are set to be enough to receive a part of one ball 12a. A distance in the circumferential direction between two adjacent levers 17, of the plurality of levers 17, is set to be enough to partially receive two balls 12a in contact with each other. Further, the outer peripheral edge portion 16c of the stopper 16 and tips of all the levers 17 are located on or nearly on a circumference of a circle concentric with the circle of the ring gear 15. The widths (more specifically, widths in an axial direction of the ring gear 15) of the stopper 16 and all the levers 17 are equal or substantially equal. Also, the widths of the stopper 16 and all the levers 17 are set to be smaller than the width of the cutout portion 10c of the pipe 10. Therefore, the stopper 16 and all the levers 17 can enter the pipe 10 through the cutout portion 10c.

On a rotation shaft 18 (corresponding to a spool-side member of the present invention) of a locking base (not illustrated) of the seatbelt retractor 3, a pinion 19 is mounted corotatably with the rotation shaft 18 (although not illustrated, the pinion 19 may be corotatably mounted on a rotation shaft of the spool). The locking base is provided in a known ELR or ALR. That is, the locking base corotates with the spool of the seatbelt retractor 3 for retracting the seatbelt 4 in a normal state, and rotation thereof is locked by a lock mechanism that is actuated in case of the above-described emergency, thereby preventing rotation of the spool in a seatbelt withdrawing direction. An ELR including a pretensioner using a plurality of balls and a locking base is described in, for example, PTL 1 described above. A detailed description of the operation of the locking base is skipped because the operation can be understood by reference to PTL 1.

The pinion 19 has a plurality of external teeth 19a. The internal teeth 15a of the ring gear 15 are able to mesh with the external teeth 19a of the pinion 19. When the pretensioner 8 is actuated, the balls 12a press the stopper 16 and the levers 17, which enter the pipe 10 through the cutout portion 10c of the pipe 10, from above, thereby applying rotational driving force to the ring gear 15 in a seatbelt retracting direction (counterclockwise in FIG. 2) and translatory moving force toward the pinion 19 to the ring gear 15. Therefore, a force transmission unit in which the force transmission members 12 formed by the balls 12a transmit the rotational driving force and the translatory moving force to the ring gear 15 is provided in the cutout portion 10c of the pipe 10.

In a normal state, the ring gear 15 is held by shear pins 20 at a non-working position illustrated in FIG. 2. At the non-working position of the ring gear 15, the internal teeth 15a are not meshed with the external teeth 19a, but are separate from the external teeth 19a. Therefore, rotation of the pinion 19 (that is, the spool) is not influenced, by the ring gear 15. In case of an emergency when the pretensioner 8 is actuated, the shear pins 20 are subjected to shear fracture by the rotational driving force and translatory moving force applied from the force transmission members 12 to the ring gear 15 in the force transmission unit, so that the ring gear 15 is placed at a working position illustrated in FIG. 3(a). At the working position of the ring gear 15, the internal teeth 15a are meshed with the external teeth 19a. Therefore, rotation of the pinion 19 (that is, the spool) is influenced by the ring gear 15.

Figure 14:
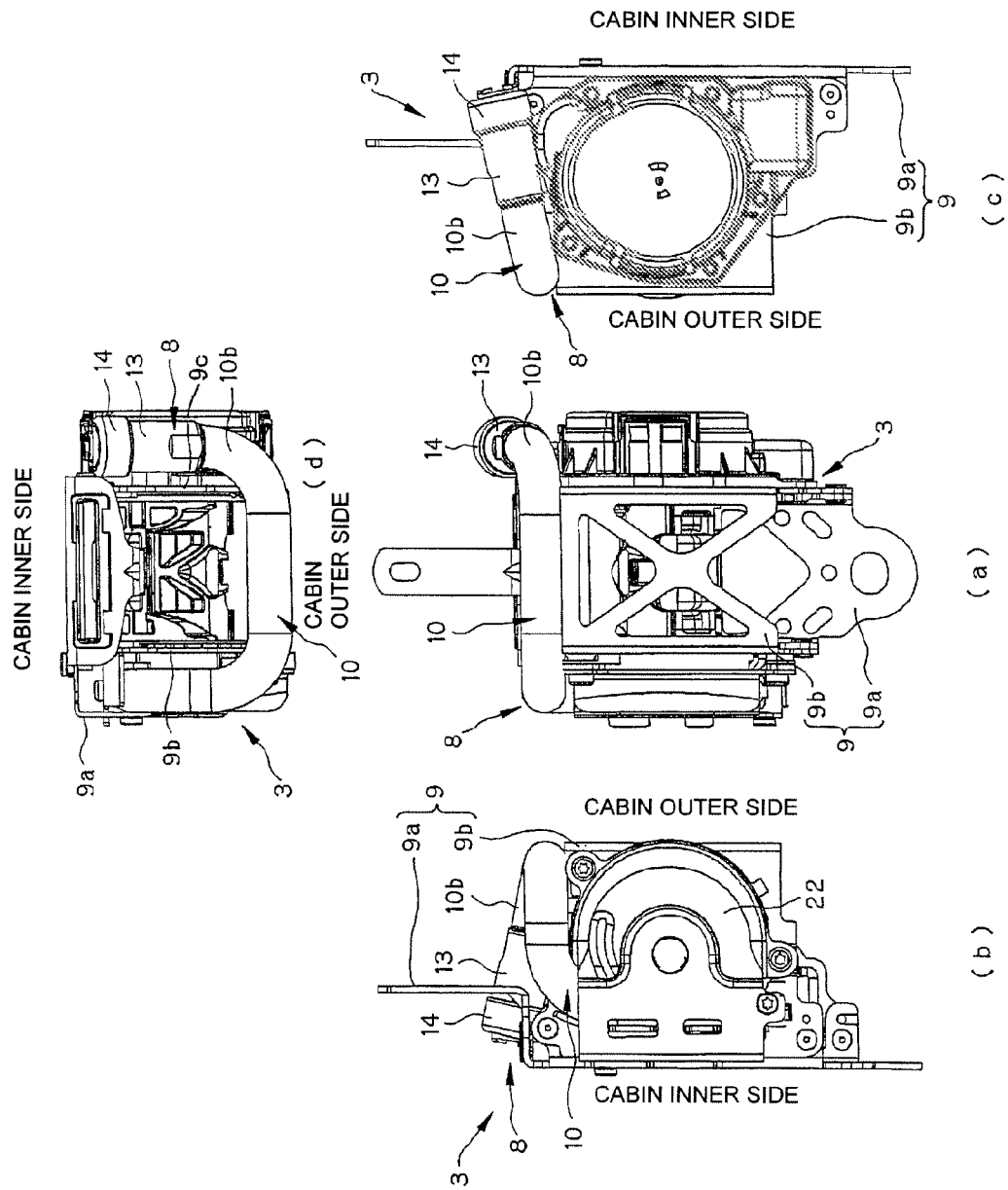
FIG. 14(a) is a front view of a seatbelt retractor including a pretensioner according to a sixth embodiment of the present invention.
FIG. 14(b) is a left side view of the seatbelt retractor of FIG. 14(a)
FIG. 14(c) is a right side view of the seatbelt retractor of FIG. 14(a)
FIG. 14(d) is a top view of the seatbelt retractor of FIG. 14(a).

In a state in which the pretensioner 8 of the first embodiment is mounted on the vehicle body, the pipe 10 is routed (piping) such that the distal end portion 10a is located at the lowermost position, the pipe 10 linearly extends upward from the distal end portion 10a, and the force transmission unit in the cutout portion 10c is substantially horizontal to the rotation point center of the pinion 19 (that is, the spool), in a manner similar to below-described piping illustrated in FIG. 14. Thus, the balls 12a transmit forces to the ring gear 15 in the seatbelt retracting direction in a substantially tangential direction of the ring gear 15. As a result, the balls 12a most efficiently transmit the forces to the ring gear 15.

Further, the pipe 10 is bent at a substantially right angle around an upper end of the base portion 9a of the frame 9 and linearly and substantially horizontally extends toward the outer side of the vehicle cabin, is bent at a substantially right angle near an end of the side wall 9b opposite the base portion 9a and linearly and substantially horizontally in a vehicle front-rear direction, and is also bent at a substantially right angle near an end of the base portion 9a in the vehicle front-rear direction and linearly extends toward the inner side of the vehicle cabin such as to slightly slope upward from the horizontal direction. Therefore, the pipe 10 is bent three-dimensionally. The pressure vessel 13 and the gas generator 14 are provided nearly above the base portion 9a such as to extend slightly upward toward the inner side of the vehicle cabin.

Figure 3:
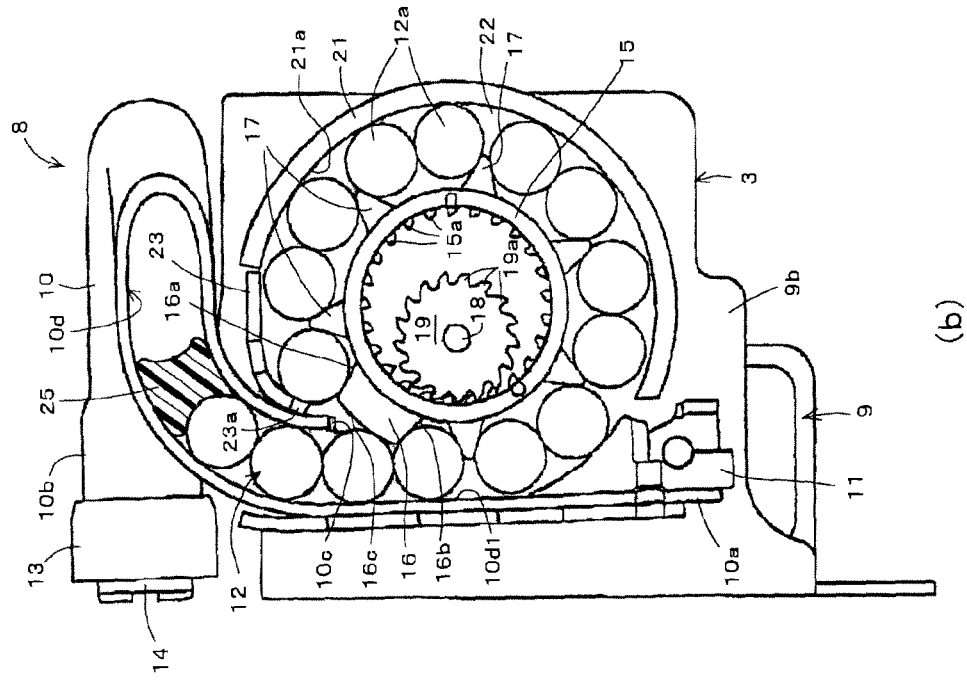
FIG. 3(a) illustrates a state during operation of the pretensioner of the first embodiment illustrated in FIG. 1.
FIG. 3(b) illustrates a state of the pretensioner at the completion of operation.
Figure 3:
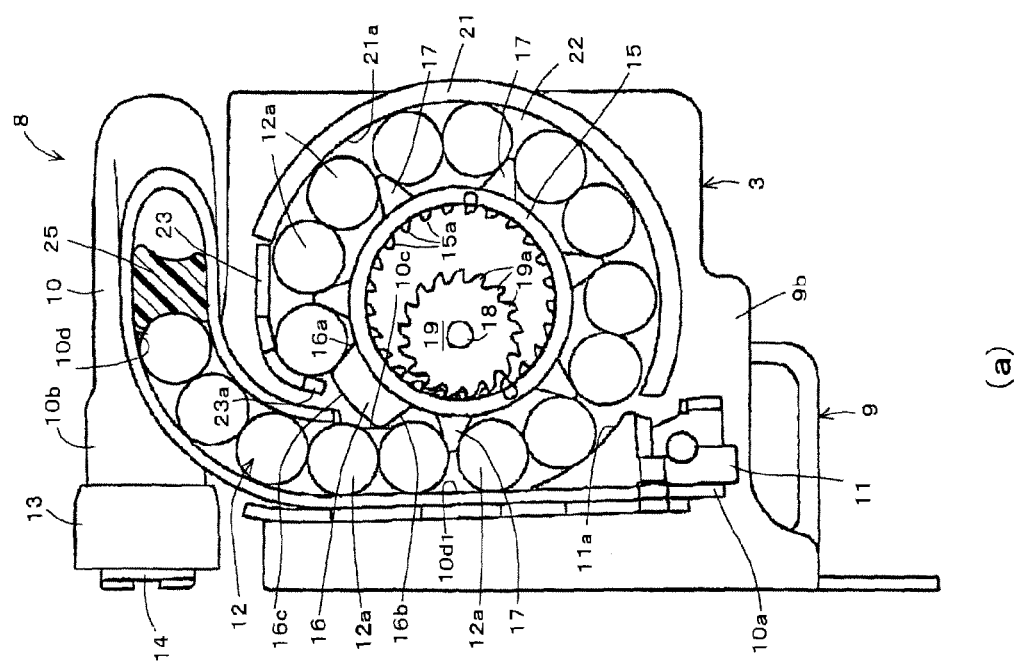

The case body of the pretensioner 8 includes a guide wall 21 having an arc-shaped guide surface 21a for guiding the balls 12a. The guide wall 21 forms a guide groove 22 that guides the balls 12a. The guide groove 22 is shaped like an arc of a circle concentric or substantially concentric with the center of the ring gear 15 in a state in which the ring gear 15 is moved to the right in FIG. 2 and the internal teeth 15a of the ring gear 15 are meshed with the external teeth 19a of the pinion 19, as illustrated in FIG. 3(a). The guide member 11 has an arc-shaped guide surface 11a, and the guide surface 11a is substantially located on one curved surface together with the guide surface 21a. Therefore, the guide surface 11a smoothly guides the balls 12a from the pipe 10 to the guide groove 22 at a connecting portion between the guide groove 22 and the pipe 10.

Further, a guide wall 23 is provided in the case body of the pretensioner and is located adjacent to an end of the arc-shaped guide wall 21 opposite the guide member 11. The guide wall 23 is substantially J-shaped such that an end thereof opposite the guide wall 21 is curved (when viewed in a state in which the left side in FIG. 2 is down). The curved end serves as a stopper 23a (corresponding to a second stopper of the present invention) of the case body with which the first ball 12a can contact. The stopper 23a is deformable such that, when the first ball 12a contacts with the stopper 23a, a distal end of the stopper 23a is moved to the left in FIG. 2 by pressing force from the first ball 12a. Therefore, such deformation of the stopper 23a reduces impact applied from the ball 12a to the stopper 23a. That is, the stopper 23a functions as an impact reducing member.

A description will be given of the operation of the pretensioner 8 of the first embodiment having such a configuration. The description will be given of the operation of the pretensioner 8 performed in a state in which the occupant is wearing the seatbelt.

The pretensioner 8 of the first embodiment basically operates in the same manner as that adopted in the pretensioner of the related art using a plurality of balls until the pretensioner 8 starts to rotate the spool of the seatbelt retractor 3 in the seatbelt retracting direction in case of the above-described emergency.

That is, as illustrated in FIG. 2, the ring gear 15 is at a non-working position in a non-operation state of the pretensioner 8. Therefore, the ring gear 15 is held in a state in which the internal teeth 15a are not meshed with the external teeth 19a of the pinion 19. Also, the ring gear 15 is held in a state in which the leading first ball 12a is in contact with an upstream side edge 16a of the stopper 16 in a ring-gear rotating direction (the rotating direction of the ring gear 15 is a counterclockwise direction in FIG. 2, that is, the seatbelt retracting direction). Further, subsequent balls 12a are sequentially made in contact with the adjacent balls 12a. At this time, the gas generator 14 does not generate gas, and the balls 12a do substantially not press the stopper 16 of the ring gear 15.

In case of the above-described emergency, the gas generator 14 starts to generate gas, and the generated gas applies a great pressing force to the balls 12a via the unillustrated piston. This pressing force is transmitted to the first ball 12a. Then, since the stopper 16 of the ring gear 15 is pressed by the first ball 12a, the shear pins 20 are subjected to shear fracture, whereby the ring gear 15 is moved to the right in FIG. 2 and rotated counterclockwise by the pressing force applied via the first ball 12a. Also, as illustrated in FIG. 3(a), the internal teeth 15a of the ring gear 15 mesh with the external teeth 19a of the pinion 19, and the pinion 19 starts to rotate in the same direction as the ring gear 15. Thus, the rotation shaft 18, that is, the spool starts to rotate in the seatbelt retracting direction, and retraction of the seatbelt 4 worn by the occupant starts. Since the first ball 12a is moved by movement and rotation of the ring gear 15, the next and subsequent balls 12a are moved along an inner peripheral surface 10d of the pipe 10.

The first ball 12a is received between the stopper 16 and the lever 17 that is first located on the upstream side of the stopper 16 in the ring-gear rotating direction, and the next second ball 12a comes into contact with the next lever 17 adjacent to the first lever 17 on the upstream side in the ring-gear rotating direction. Therefore, the second and third balls 12a press the next lever 17 similarly. The pressing force applied to the next lever 17 via the second and third balls 12a further rotates both the ring gear 15 and the pinion 19 counterclockwise. Thus, the seatbelt 4 is further retracted on the spool. At this time, the pressing force of the first ball 12a on the stopper 16 is substantially lost.

Two balls, namely, the second and third balls 12a are received between the first lever 17 and the second lever 17. Next, the fourth ball 12a comes into contact with a subsequent lever 17 adjacent to the next lever 17 on the upstream side in the ring-gear rotating direction. That is, the fourth and fifth balls 12a press the subsequent lever 17 similarly. The pressing force applied to the subsequent lever 17 via the fourth and fifth balls 12a further rotates both the ring gear 15 and the pinion 19 counterclockwise. Thus, the seatbelt 4 is further retracted on the spool. At this time, the pressing force of the second and third balls 12a on the lever 17 is substantially lost.

After that, the sixth ball 12a and subsequent balls 12a sequentially press the levers 17 similarly, and therefore, both the ring gear 15 and the pinion 19 further rotate counterclockwise. Thus, the seatbelt 4 is further retracted on the spool.

The balls 12a, whose pressing forces on the stopper 16 and the levers 17 are substantially lost, move along the guide groove 22 with the rotation of the ring gear 15 while being received between the stopper 16 and the lever 17 or between the adjacent levers 17. Then, as illustrated in FIG. 3(a), the first ball 12a comes into contact with the stopper 23a of the case body. At this time, a side edge 16b of the stopper 16 of the ring gear 15 on the downstream side in the ring-gear rotating direction is not in contact with the opposing ball 12a.

When the first ball 12a comes into contact with the stopper 23a, the stopper 23a is deformed by the pressing force of the first ball 12a and the ring gear 15 further rotates counterclockwise, as illustrated in FIG. 3(b). By this deformation of the stopper 23a, kinetic energy of the balls 12a is absorbed partially. By the further counterclockwise rotation of the ring gear 15, the outer peripheral edge 16c of the stopper 16 of the ring gear 15 is brought into contact with the opposing ball 12a, as illustrated in FIG. 3(b), and the opposing ball 12a is clamped between the outer peripheral edge 16c of the stopper 16 and an inner peripheral surface $10d_1$ of the pipe 10 opposite the cutout portion 10c.

Since the clamping force for the ball 12a produced by the rotating force of the ring gear 15 (that is, the pressing force of the stopper 16 on the ball 12a) is increased by a wedge effect between the outer peripheral edge 16c of the stopper 16 and the inner peripheral surface $10d_1$ of the pipe 10, the contact force of the outer peripheral edge 16c of the stopper 16 with the ball 12a increases. This wedge effect is exerted because the distance between the outer peripheral edge 16c of the stopper 16 and the inner peripheral surface $10d_1$ of the pipe 10 gradually decreases in the moving direction of the ball 12a (that is, in the rotating direction of the ring gear 15). This disables movement of the ball 12a and stops rotation of the ring gear 15. Therefore, rotations of the pinion 19 and the spool are stopped, and retraction of the seatbelt on the spool is finished. By thus retracting the seatbelt 4 with the pretensioner 8, the occupant restraint force of the seatbelt 4 is increased. In this case, the relationship between the rotation amount of the ring gear 15 and the rotation amount of the spool (that is, the seatbelt retraction amount of the spool) is determined by appropriately setting the gear ratio between the internal teeth 15a of the ring gear 15 and the external teeth 19a of the pinion 19.

When the rotation of the ring gear 15 stops, the movements of the second and subsequent balls 12a also stop. At this time, the gas pressure of gas generated in the pipe 10 is low. In such a state in which the balls 12a are stopped, most of the balls 12a are located along the outer peripheral surface of the ring gear 15, and the remaining balls 12a and the piston are located in the pipe 10.

Other operations of the pretensioner 8 of the first embodiment are substantially the same as the operations of the pretensioner of the related art using a plurality of balls. Further, other operations of the seatbelt retractor 3 of the first embodiment are also substantially the same as the operations of the known ELR or ALR.

According to the pretensioner 8 and the seatbelt retractor 3 of the first embodiment, when the ring gear 15 rotates by a predetermined rotation amount in the seatbelt retracting direction, the outer peripheral edge 16c of the stopper 16 provided in the ring gear 15 contacts and presses the opposing ball 12a. This contact of the stopper 16 with the ball 12a can stop the rotation of the ring gear 15. In particular, since the clamping force between the outer peripheral edge 16c of the stopper 16 and the inner peripheral surface $10d_1$ of the pipe 10 is increased by the wedge effect in the pretensioner 8 of the first embodiment, the rotation of the ring gear 15 can be stopped effectively.

Since the outer peripheral edge 16c of the stopper 16 provided in the ring gear 15 directly presses the ball 12a, it is unnecessary to connect a pair of balls 12a by a connecting member such as a bridge, unlike the example of the pretensioner of PTL 2 described above. Therefore, a connecting structure for a pair of balls 12a can be eliminated. Thus, a stopper structure of the stopper 16 and the ball 12a is simplified, and the stopper structure does not need to be large. As a result, the stopper structure formed by the stopper 16 and the ball 12a can be easily placed in the limited space in the case body, and this can suppress the increase in cost of the pretensioner 8.

Further, since it is unnecessary to connect the pair of balls 12a by the connecting member such as a bridge, all balls 12a can smoothly move in the pipe 10. In particular, since the pipe 10 is three-dimensionally bent in the pretensioner 8 of the first embodiment, the balls 12a can more smoothly move in the pipe 10. Moreover, since the connecting structure for the pair of balls 12a is unnecessary, the production process for the pretensioner 8 is simplified, and the cost of the pretensioner 8 can be reduced further.

Further, according to the pretensioner 8 and the seatbelt retractor 3 of the first embodiment, before the stopper 16 of the ring gear 15 stops the rotation of the ring gear 15, the first ball 12a comes into contact with the stopper 23a provided in the case body to absorb kinetic energy of the balls 12a. This reduces the impact caused when the outer peripheral edge 16c of the stopper 16 in the ring gear 15 contacts with the ball 12a.

Therefore, the rotation of the ring gear 15 can be more effectively stopped by the press of the stopper 16 of the ring gear 15 on the ball 12a.

Further, according to the seatbelt apparatus 1 including the seatbelt retractor 3 of the first embodiment, since the rotation of the ring gear 15 can be effectively stopped by the contact of the stopper 16 with the ball 12a, the occupant restraint performance of the seatbelt 4 using the operation of the pretensioner 8 can be enhanced.

Figure 4:
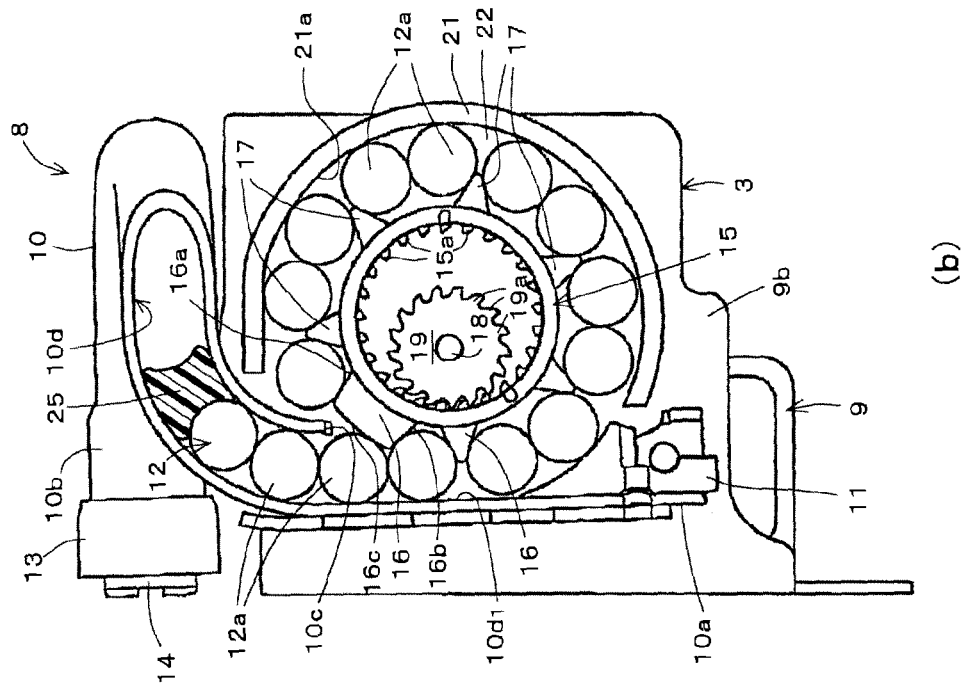
FIGS. 4(a) and 4(b) illustrate a pretensioner according to a second embodiment of the present invention, similarly to FIGS. 2 and 3(h), respectively.
Figure 4:
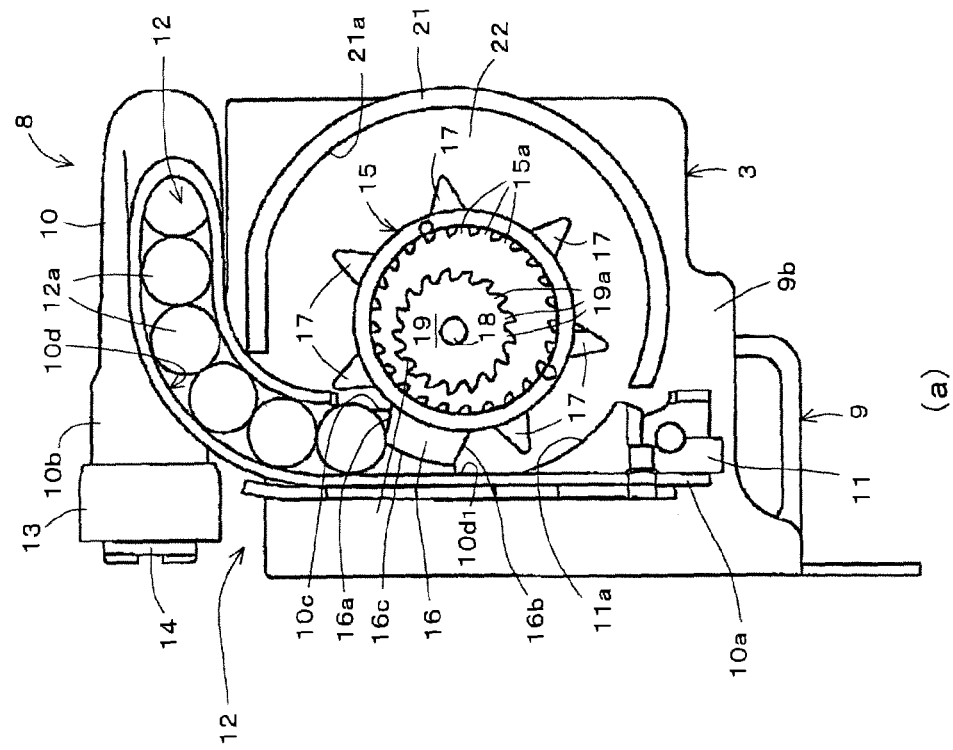

FIGS. 4(a) and 4(b) illustrate a pretensioner according to a second embodiment of the present invention, similarly to FIGS. 2 and 3(b), respectively.

While the pretensioner 8 includes the stopper 23a provided in the case body in the above-described first embodiment, a pretensioner 8 of the second embodiment does not include the stopper 23a of the first embodiment, as illustrated in FIGS. 4(a) and 4(b). Other structures of the pretensioner 8 of the second embodiment are the same as those adopted in the first embodiment.

Since the pretensioner 8 of the second embodiment does not include the stopper 23a, it cannot obtain the operational effect of the stopper 23a in the pretensioner 8 of the first embodiment. Other operational effects of the pretensioner 8 of the second embodiment are the same as those of the first embodiment.

Figure 5:
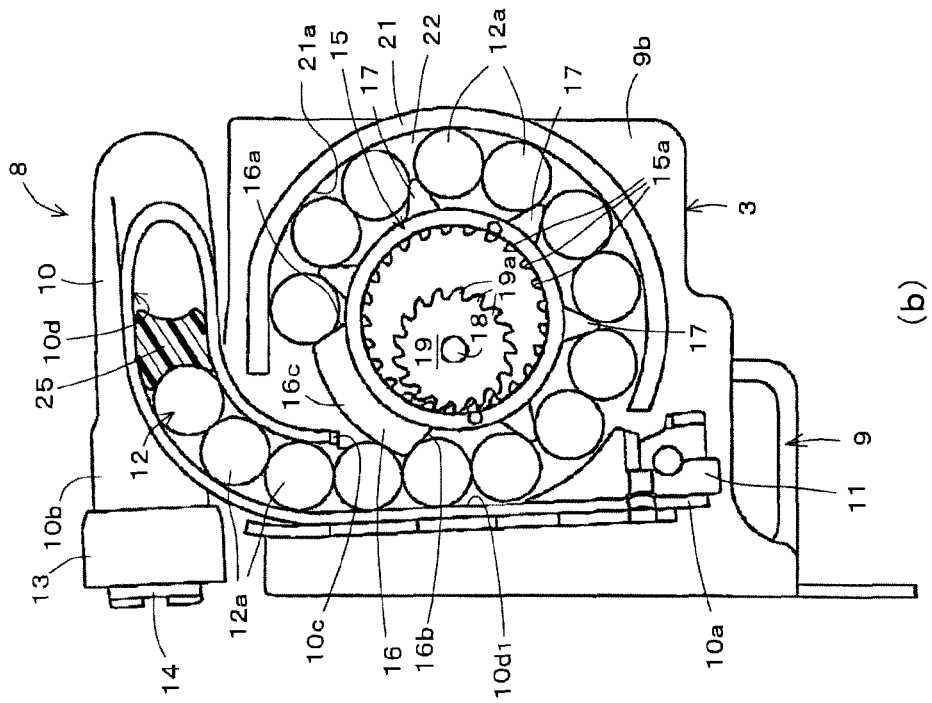
FIGS. 5(a) and 5(b) illustrate a pretensioner according to a third embodiment of the present invention, similarly to FIGS. 4(a) and 4(b), respectively.
Figure 5:
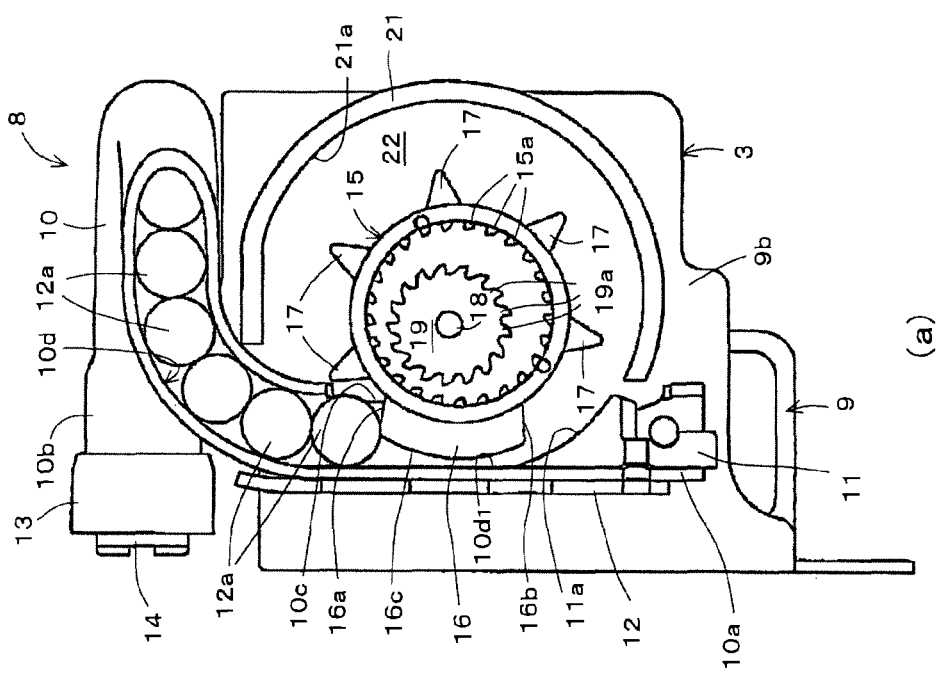

FIGS. 5(a) and 5(b) illustrate a pretensioner according to a third embodiment of the present invention, similarly to FIGS. 4(a) and 4(b), respectively.

While a space to receive a part of one ball 12a is provided between a side edge 16b of a stopper 16 on a downstream side in the ring-gear rotating direction and a lever 17 in the above-described second embodiment illustrated in FIGS. 4(a) and 4(b), a pretensioner 8 of the third embodiment does not include, on a side edge 16b side of a stopper 16 on the downstream side in the ring-gear rotating direction, a space to receive a part of one ball 12a, as illustrated in FIGS. 5(a) and 5(b). Therefore, in the pretensioner B of the third embodiment, the number of levers 17 of a ring gear 15 is five, which is smaller by one than in the pretensioner 8 of the second embodiment illustrated in FIGS. 4(a) and 4(b).

According to the pretensioner 8 of the third embodiment, the space to receive a part of one ball 12a is not provided on the side edge 16b side of the stopper 16 on the downstream side in the ring-gear rotating direction. Hence, the circumferential length of an outer peripheral edge 16c of the stopper 16 can be made more than in the above-described second embodiment. Thus, it is possible to flexibly set the rotation amount from the start of rotation of the ring gear 15 to the stop of rotation of the ring gear 15. Therefore, the degree of flexibility in setting the tension of the seatbelt by the pretensioner 8 can be increased.

Other structures and other operational effects of the pretensioner 8 of the third embodiment are the same as those in the above-described second embodiment illustrated in FIGS. 4(a) and 4(b).

Figure 6:
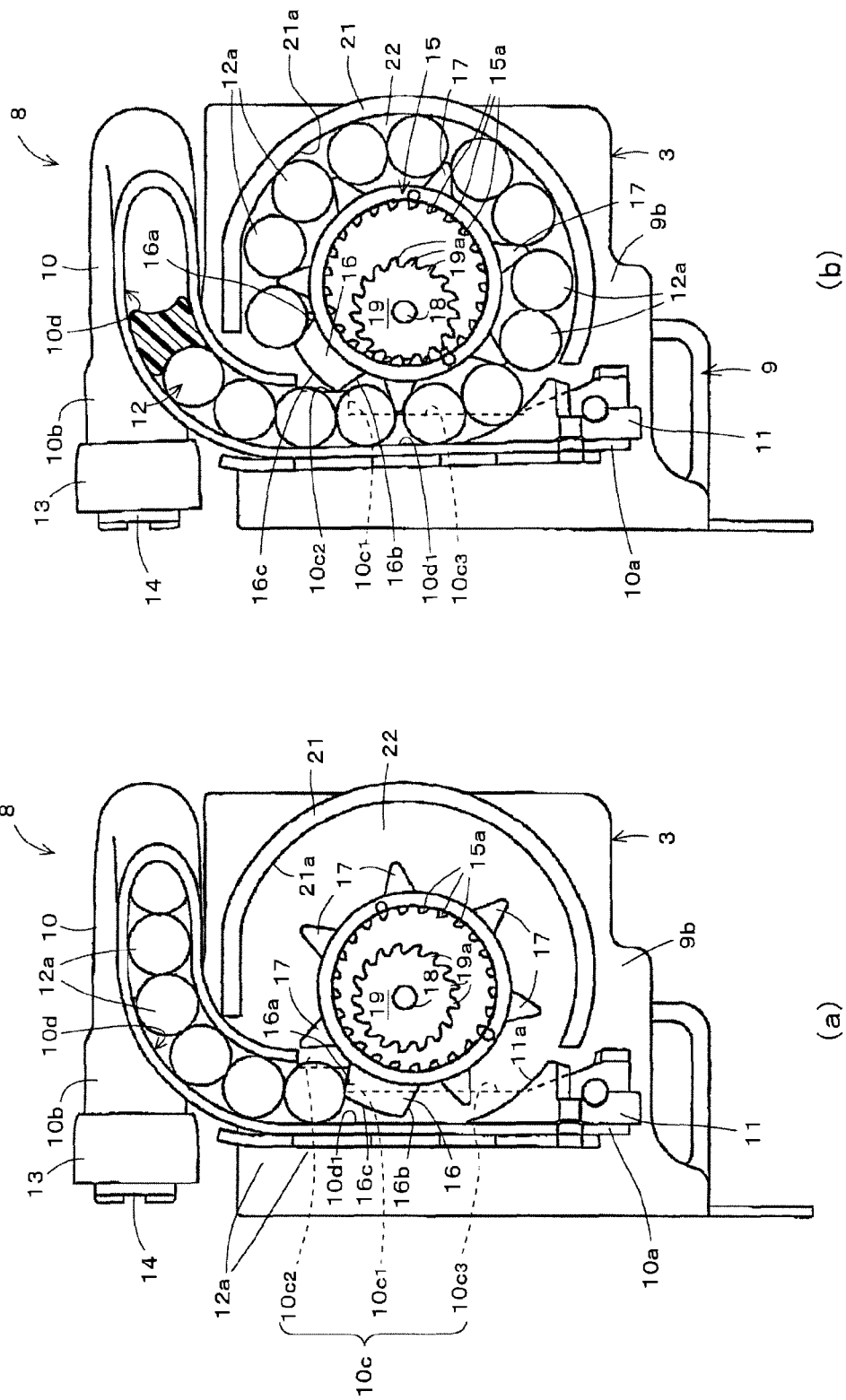
FIGS. 6(a) and 6(b) illustrate a pretensioner according to a fourth embodiment of the present invention, similarly to FIGS. 4(a) and 4(b), respectively.
Figure 7:
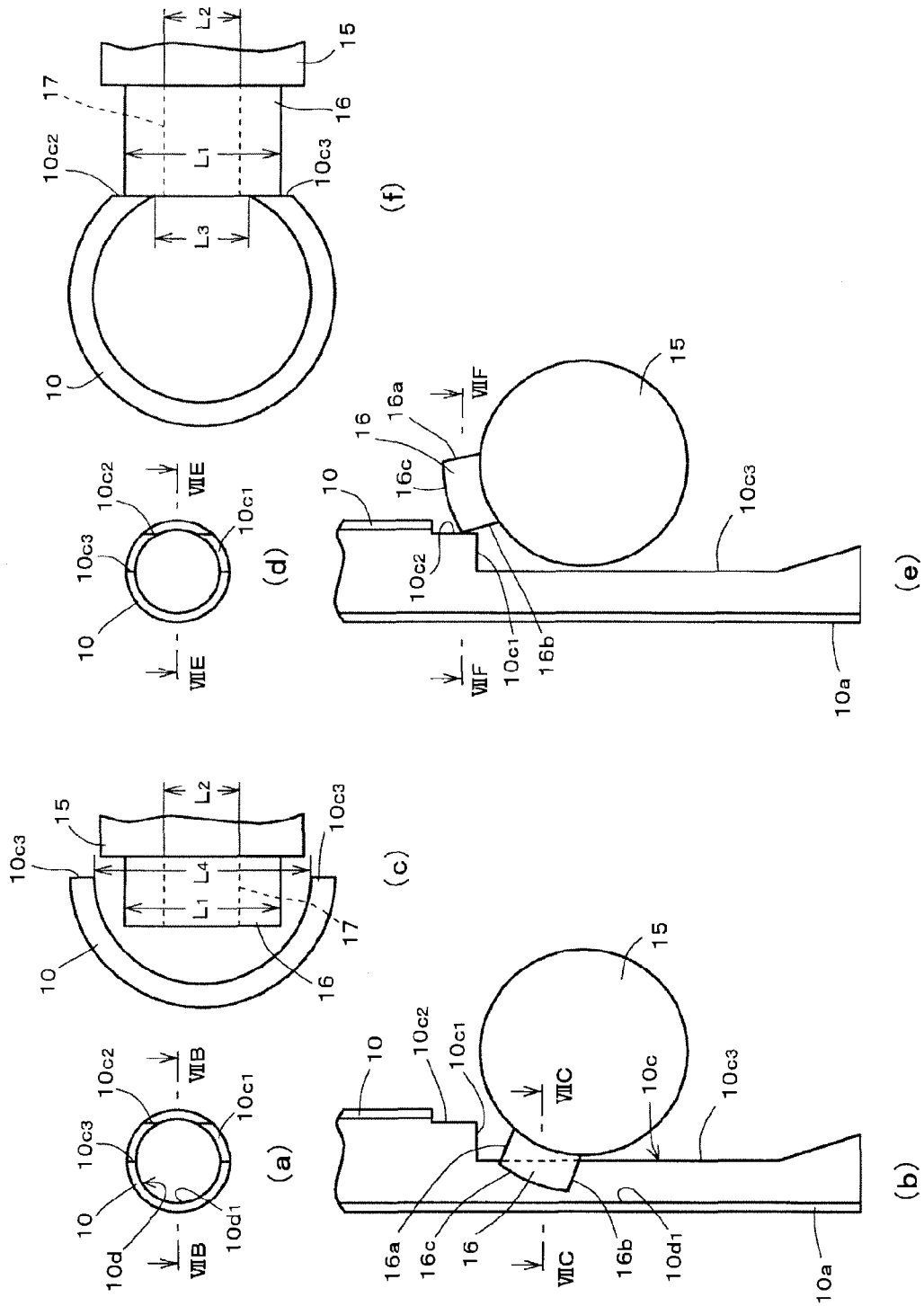
FIG. 7(a) is a bottom view of a pipe in the fourth embodiment of FIG. 6(a)
FIG. 7(b) is a cross-sectional view, taken along line VIIB-VIIB of FIG. 7(a)
FIG. 7(c) is a sectional view, taken along line VIIC-VIIC of FIG. 7(b)
FIG. 7(d) is a bottom view of the pipe in the fourth embodiment of FIG. 6(a)
FIG. 7(e) is a cross-sectional view, taken along line VIIE-VIIE of FIG. 7(d)
FIG. 7(f) is a sectional view, taken along line VIIF-VIIF of FIG. 7(e).

FIGS. 6(a) and 6(b) illustrate a pretensioner according to a fourth embodiment of the present invention, similarly to FIGS. 4(a) and 4(b), respectively. FIG. 7(a) is a bottom view of a pipe in the fourth embodiment illustrated in FIG. 6(a), FIG. 7(b) is a cross-sectional view, taken along VIIB-VIIB of FIG. 7(a), FIG. 7(c) is a sectional view, taken along line VIIC-VIIC of FIG. 7(b), FIG. 7(d) is a bottom view of the pipe in the fourth embodiment illustrated in FIG. 6(a), FIG. 7(e) is a cross-sectional view, taken along line VIIE-VIIE of FIG. 7(d), and FIG. 7(f) is a sectional view, taken along line VIIF-VIIF of FIG. 7(e).

In the pretensioners 8 of the above-described embodiments, the width of the stopper 16 and the width of all levers 17 (specifically, the widths in the axial direction of the ring gear 15) are equal or substantially equal, and the widths of the stopper 16 and all the levers 17 are set to be smaller than the width of the cutout portion 10c of the pipe 10. Further, the width of the cutout portion 10c of the pipe 10 (specifically, the width in the same direction as the axial direction of the ring gear 15) is uniform. Therefore, the stopper 16 and all the levers 17 can enter the pipe 10 through the cutout portion 10c.

In contrast, as illustrated in FIG. 7(c), a width $L_1$ (cm) of a stopper 16 is set to be more than a width $L_2$ (cm) of all levers 17. As illustrated in FIGS. 6(a), 6(b), 7(a), and 7(b), a cutout portion 10c of a pipe 10 is formed to have a stepped portion $10c_1$. In this case, as illustrated in FIG. 7(f), a width $L_3$ (cm) of a cutout portion part $10c_2$ on an upper side of the stepped portion $10c_1$ is set to be less than the width $L_1$ of the stopper 16 and more than the width $L_2$ of all the levers 17 ($L_2<L_3<L_1$). Further, as illustrated in FIG. 7(c), a width $L_4$ (cm) of a cutout portion part $10c_3$ on a lower side of the stepped portion $10c_1$ is set to be more than the width $L_1$ of the stopper 16 and the width $L_2$ of all the levers 17 ($L_2<L_3<L_1<L_4$).

Therefore, as illustrated in FIG. 7(c), when the stopper 16 is located at the cutout portion part $10c_3$, it can enter the pipe 10 through the cutout portion part $10c_3$. As illustrated in FIG. 7(f), when the stopper 16 is located at the cutout portion part $10c_2$, it contacts with a pipe side edge of the cutout portion part $10c_2$, but is unable to enter the pipe 10.

Other structures of the pretensioner 8 of the fourth embodiment are the same as those adopted in the above-described third embodiment illustrated in FIGS. 4(a) and 4(b).

In the pretensioner 8 of the fourth embodiment having this configuration, in a normal non-operation state of the pretensioner 8, the stopper 16 is located at the cutout portion part $10c_3$ illustrated in FIGS. 6(a), 7(b), and 7(c). Therefore, a part of the stopper 16 is in the pipe 10. The position of the stopper 16 illustrated in FIG. 6(a) is the same as the position of the stopper 16 illustrated in FIG. 4(a).

In an operation state of the pretensioner 8, the ring gear 15 is rotated counterclockwise in FIG. 6(a) by the pressing force of balls 12a, similarly to the above-described embodiments. When the ring gear 15 rotates by a predetermined rotation amount, a boundary portion between a side edge 16b and an outer peripheral edge 16c of the stopper 16 comes into contact with a pipe side edge of the cutout portion part $10c_2$ of the pipe 10, as illustrated in FIG. 6(b). At this time, since the stopper 16 is unable to enter the pipe 10, as described above, the rotation of the ring gear 15 is stopped. Thus, rotations of a pinion 19 and a spool are stopped, and seatbelt retraction on the spool is completed. By this retraction of the seatbelt 4 using the pretensioner 8, the occupant restraint force of the seatbelt 4 is increased.

According to the pretensioner 8 of the fourth embodiment, the rotation of the ring gear 15 is stopped by the contact of the stopper 16 of the ring gear 15 with the cutout portion part $10c_2$ of the pipe 10. Hence, it is possible to effectively and more accurately stop the rotation of the ring gear 15.

Other operational effects of the pretensioner 8 of the fourth embodiment are the same as those of the above-described third embodiment illustrated in FIGS. 4(a) and 4(b). It is satisfactory as long as the width $L_1$ (cm) of the stopper 16 is set at at least the width of a part of a side edge 16b side portion of the stopper 16 on the downstream side in the ring-gear rotating direction, and the width of a side edge 16a side portion on the upstream side in the ring-gear rotating direction can be set to be equal to the width $L_2$ of the levers 17 for example.

Figure 8:
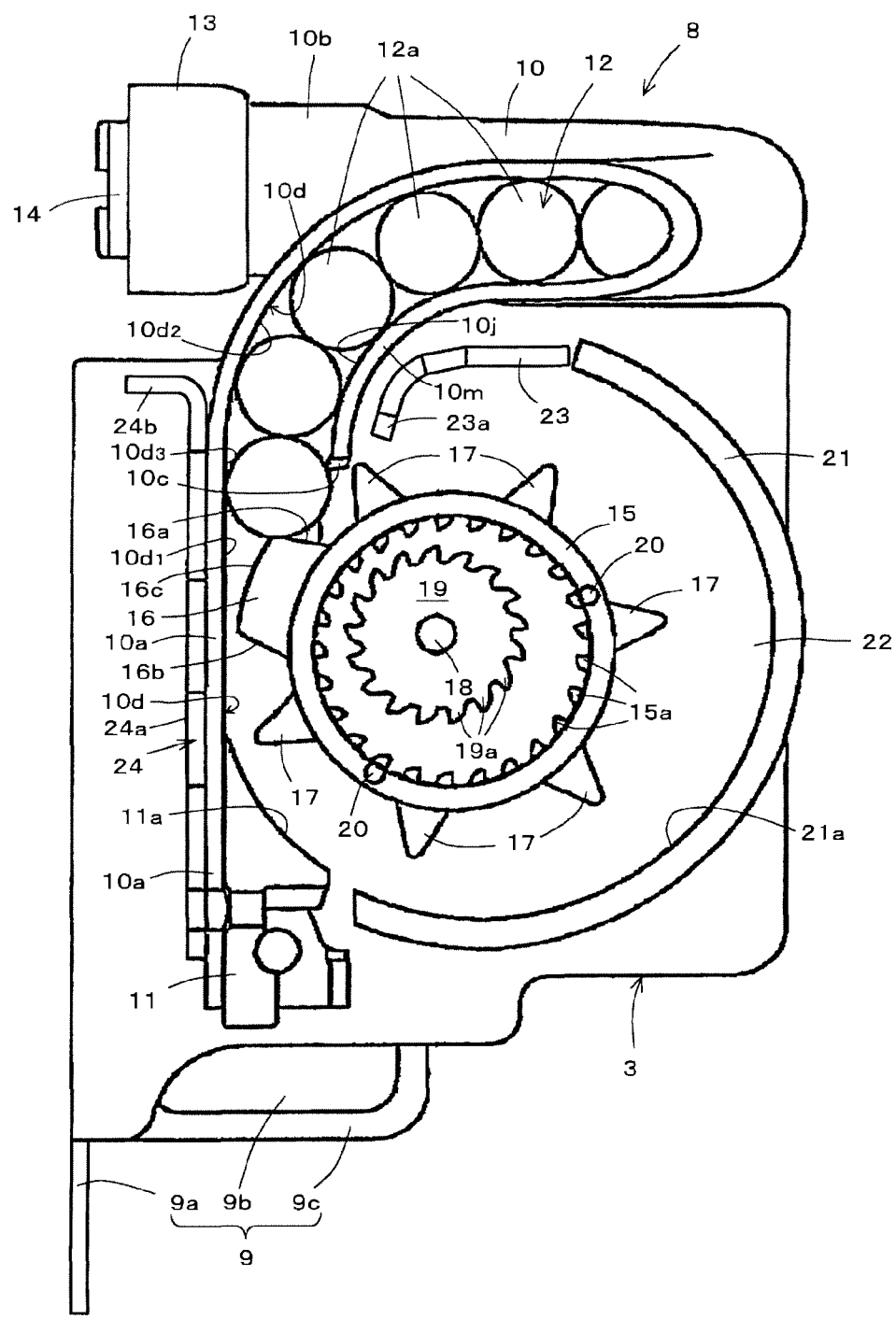
FIG. 8 is a partially cutaway side view of a seatbelt retractor including a pretensioner according to a fifth embodiment of the present invention.

FIG. 8 is a partially cutaway side view of a pretensioner according to a fifth embodiment of the present invention, similarly to FIG. 2.

As illustrated in FIG. 8, in a pretensioner 8 of the fifth embodiment, a cutout portion 10c of a pipe 10 is also provided in an inner peripheral surface 10j of a curved portion 10m, similarly to the above-described embodiments. Further, the outer diameter of all balls 12a is set to be slightly smaller than the inner diameter of the pipe 10, similarly to the above-described embodiments.

Similarly to the above-described embodiments, the pretensioner 8 of the fifth embodiment includes a case body 27 (illustrated in FIG. 12 described below), and the case body 27 is attached to a side wall 9b. In the case body 27, a ring gear 15 is provided rotatably and movably to the right in FIG. 8

Figure 9:
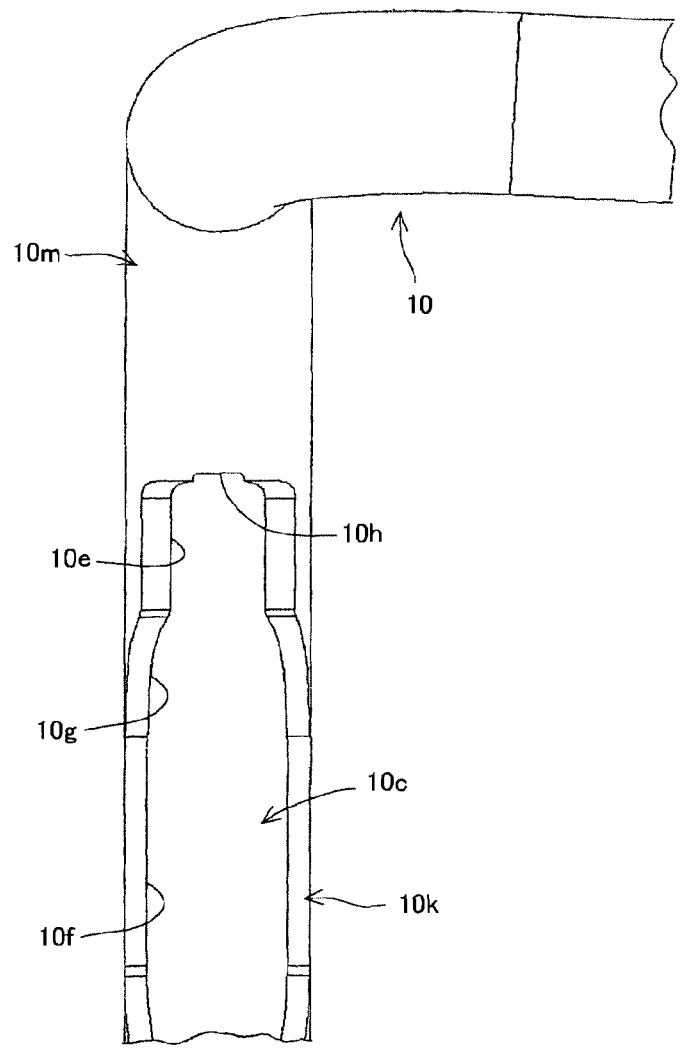
FIG. 9 illustrates a cutout portion of a pipe used in the pretensioner of the fifth embodiment.

As illustrated in FIG. 9, the cutout portion 10c at a distal end of the pipe 10 includes a narrow portion 10e, a wide portion 10f, an inclined portion 10g, and a cutout end portion 10h. The narrow portion 10e is provided on a gas generator 14 side, and the wide portion 10f is provided at a position where the balls 12a start to contact with the levers 17 of the ring gear 15.

Figure 10:
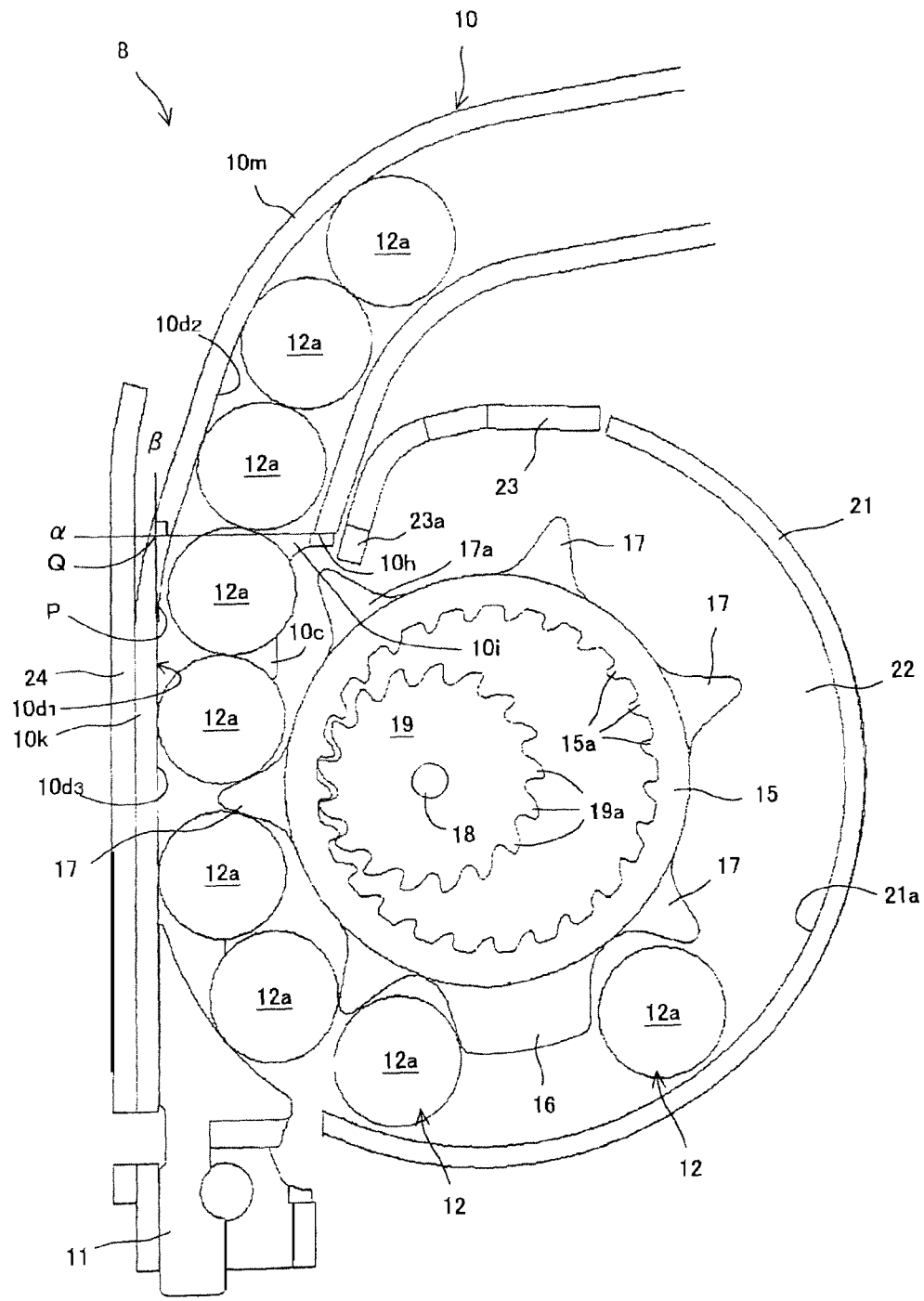
FIG. 10 illustrates the shape of the pipe used in the pretensioner of the fifth embodiment.

As illustrated in FIG. 10, similarly to the above-described related art, at a position where the balls 12a start to press the corresponding levers 17 of the ring gear 15 in a force transmission unit, the pipe 10 forms a straight portion 10k extending straight in the longitudinal direction of the pipe 10, and a portion connected to the straight portion 10k on an upstream side in the moving direction of the balls 12a forms a curved portion 10m curved in the longitudinal direction of the pipe 10. Therefore, an inner peripheral surface $10d_1$ provided on an outer side of the curved portion 10m of the pipe 10 (that is, an inner peripheral surface opposing the cutout portion 10c) includes a curved inner peripheral surface $10d_2$ curved in the curved portion 10m in the longitudinal direction of the pipe 10, and a straight inner peripheral surface $10d_3$ extending straight in the straight portion 10k in the longitudinal direction of the pipe 10. Thus, the inner peripheral surface $10d_1$ of the pipe 10 includes a transition portion P from the curved inner peripheral surface of the curved portion 10m to the straight inner peripheral surface of the straight portion 10k. This transition portion P is located closer to the position where the balls 12a start to press the levers 17 of the ring gear 15 (a side opposite the gas generator 14 side) than an intersection Q where an imaginary straight line α extending from the cutout end portion 10h of the cutout portion 10c intersects an imaginary extension line β of the inner peripheral surface $10d_1$ of the straight portion 10k of the pipe 10 at a right angle.

Figure 11:
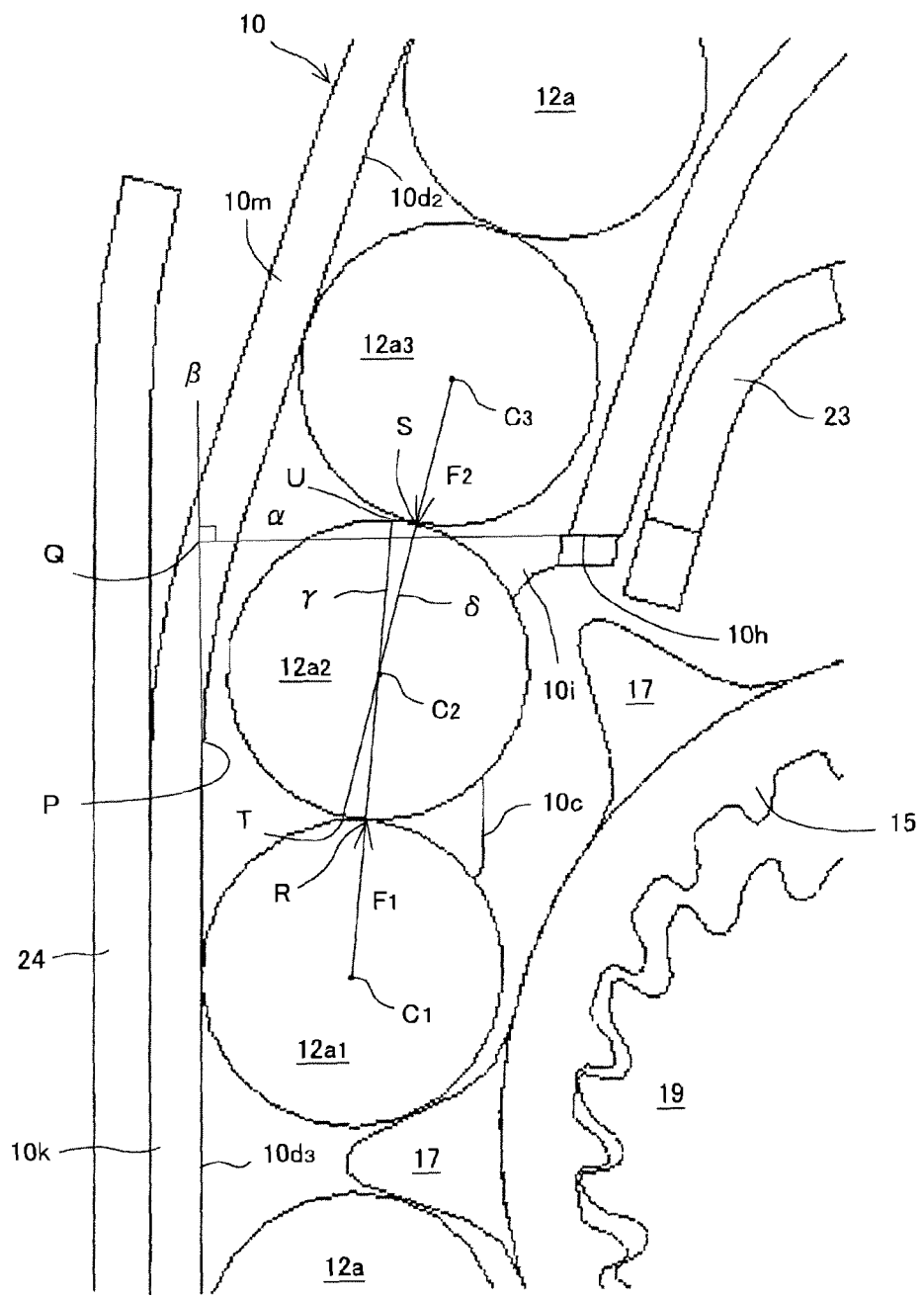
FIG. 11 illustrates behavior of balls in the pipe having the shape of FIG. 10.

As illustrated in FIG. 11, it is here assumed that a first ball $12a_1$ (it is not limited to a ball 12a that first presses the ring gear 15, but is a leading one $12a_1$ of three balls $12a_1$, $12a_2$, and $12a_3$ illustrated in FIG. 11, this also applies to second and third balls) presses a lever 17 of the ring gear 15, a second ball $12a_2$ presses the first ball $12a_1$, and a third ball $12a_3$ presses the second ball $12a_2$. At this time, it is also assumed that the second ball $12a_2$ is maximally moved toward the cutout portion 10c and is separate from the inner peripheral surface $10d_1$ of the pipe 10.

When the second ball $12a_2$ is going to move through the transition portion P from the curved portion 10m to the straight portion 10k of the pipe 10 in this state, a reaction force $F_1$ is applied from the first ball $12a_1$ to the second ball $12a_2$, and a pressing force $F_2$ is also applied thereto from the third ball $12a_3$. At this time, the reaction force $F_1$ acts on a point of action R of the second ball $12a_2$ on a straight line γ connecting a center $c_1$ of the first ball $12a_1$ and a center $c_2$ of the second ball $12a_2$. The pressing force $F_2$ acts on a point of action S of the second ball $12a_2$ on a straight line δ connecting the center $c_2$ of the second ball $12a_2$ and a center $c_3$ of the third ball $12a_3$. The point of action R of the reaction force $F_1$ is located closer to the cutout portion 10c than a point T of the second ball $12a_2$ where the straight line δ intersects an outer peripheral surface of the second ball $12a_2$ opposite the point of action S. Further, the point of action S of the pressing force $F_2$ is located closer to the cutout portion 10c than a point 13 of the second ball $12a_2$ where the straight line γ intersects an outer peripheral surface of the second ball $12a_2$ opposite the point of action R. Thus, even when the second ball $12a_2$ maximally separates from the inner peripheral surface $10d_1$ of the pipe 10, it is pressed by the first and third balls $12a_1$ and $12a_3$ toward the inner peripheral surface $10d_1$ of the pipe 10 opposite the cutout portion 10c. Therefore, the second ball $12a_2$ is restrained from deforming a portion 10i of the pipe 10 near the cutout portion 10c, and the second ball $12a_2$ is also restrained from coming out from the cutout portion 10c.

Figure 12:
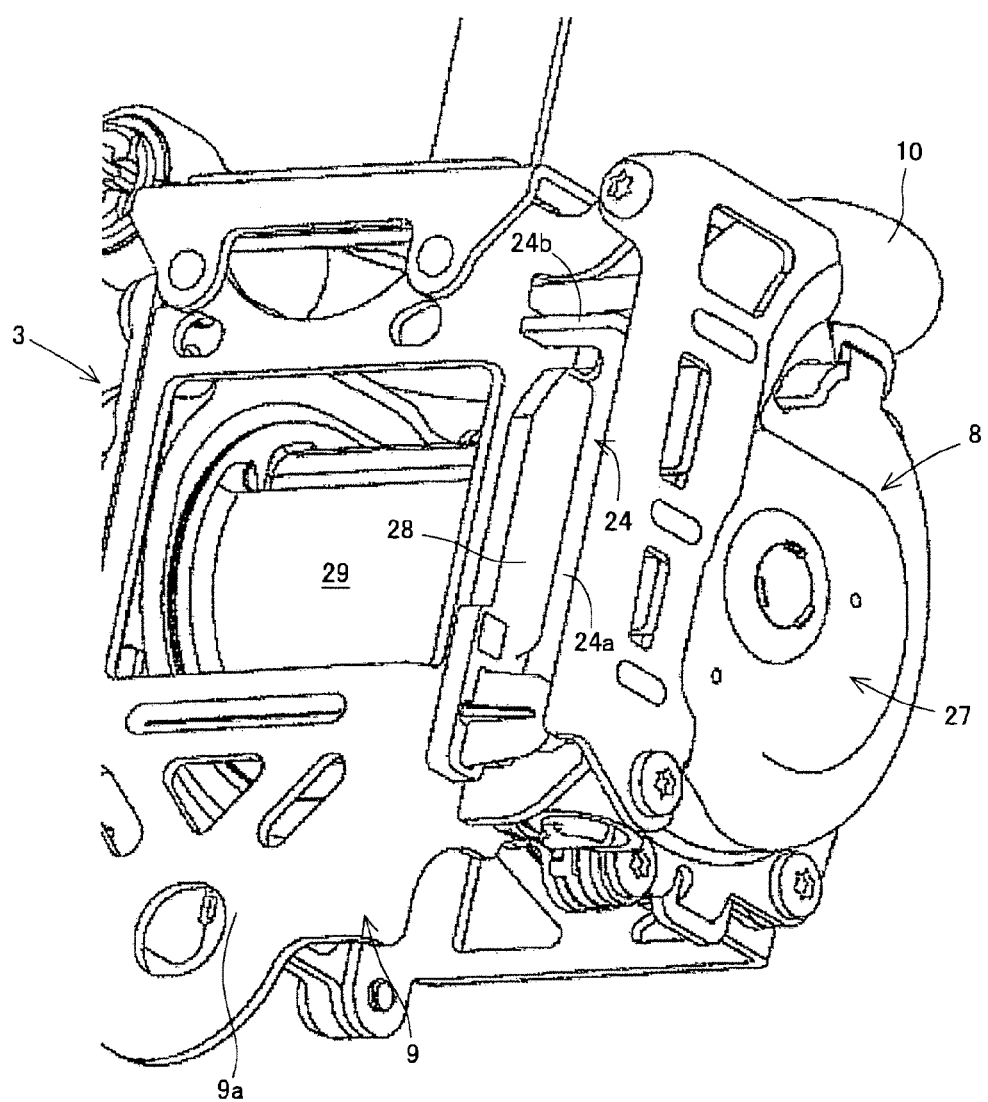
FIG. 12 is a perspective view of a reinforcing portion in a pipe mount portion of the pretensioner of the fifth embodiment.
Figure 13:
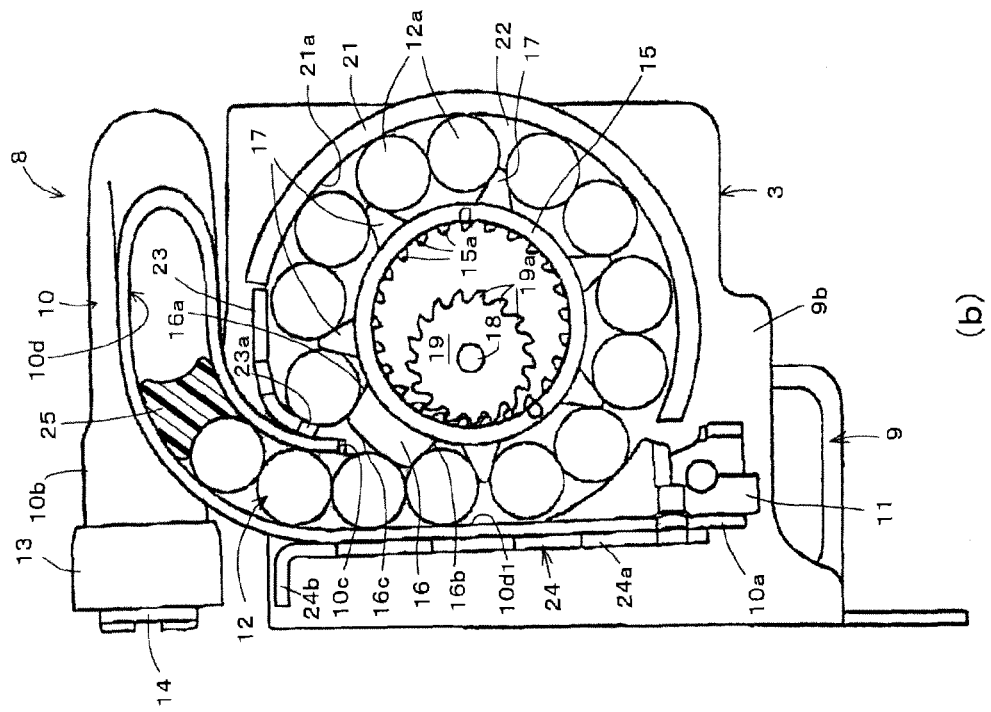
FIG. 13(a) illustrates a state during operation of the pretensioner of the fifth embodiment.
FIG. 13(b) illustrates a state of the pretensioner at the completion of operation.
Figure 13:
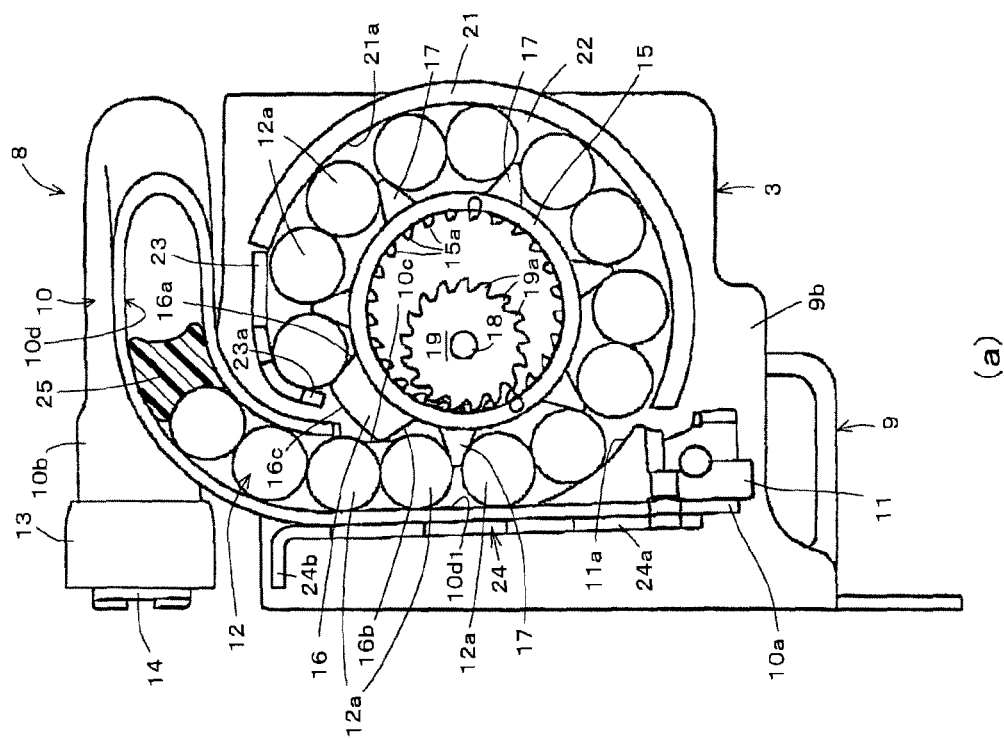

As illustrated in FIGS. 8 and 12, a pipe mount portion 24 is formed by an L-shaped flat plate including a long side portion 24a and a short side portion 24b formed by bending an upper end of the long side portion 24a nearly at a right angle. A side of the pipe 10 opposing the cutout portion 10c is mounted and fixed to one surface of the long side portion 24a of the pipe mount portion 24. The short side portion 24b is provided in contact with the side wall 9b of a frame 9. The short side portion 24b prevents the pipe mount portion 24 from tilting when an outer peripheral edge portion 16c of a stopper 16 presses the ball 12a at the end of operation of the pretensioner 8. In particular, since the pipe mount portion 24 is fixed at a lower end to a guide member 11 and a position where the outer peripheral edge portion 16c of the stopper 16 presses the pipe mount portion 24 via the ball 12a is located at an upper end of the pipe mount portion 24, when the short side portion 24b is provided at the upper end of the long side portion 24a, the pressing force of the outer peripheral edge portion 16c of the stopper 16 is supported efficiently. Thus, the pipe mount portion 24 is effectively prevented from tilting and deforming when the outer peripheral edge portion 16c of the stopper 16 presses the pipe mount portion 24. That is, the short side portion 24b serves as a reinforcing portion for the pipe mount portion 24 when the outer peripheral edge portion 16c of the stopper 16 presses the ball 12a at the end of operation of the pretensioner 8.

Further, a rib 28 shaped like a flat plate extending straight in the up-down direction is fixed to the other surface of the long side portion of the pipe mount portion 24 opposite the surface to which the pipe 10 is fixed. The rib 28 is provided at a position to counteract the pressing force when the outer peripheral edge portion 16c of the stopper 16 presses the ball 12a at the end of operation of the pretensioner 8. Since the rib 28 reinforces the pipe mount portion 24, the pipe mount portion 24 is prevented from deforming when the outer peripheral edge portion 16c of the stopper 16 presses the ball 12a. In FIG. 12, reference numeral 29 denotes a spool of a seatbelt retractor 3 that retracts a seatbelt 4.

In the pretensioner 8 of the fifth embodiment having such a configuration, the pressing force of the outer peripheral edge 16c of the stopper 16 on the ball 12a is supported by the pipe mount portion 24, similarly to the above-described first embodiment. Even when the pressing force increases, the pipe mount portion 24 is also reinforced by the rib 28, and therefore, is prevented from being deformed by the pressing force.

According to the pretensioner 8 and the seatbelt retractor 3 of the fifth embodiment, the transition portion P between the inner peripheral surface $10d_1$ of the straight portion 10k of the pipe 10 and the inner peripheral surface $10d_1$ of the curved portion 10m connected to the straight portion 10k on the upstream side in the moving direction of the balls 12a at the position where the balls 12a press the corresponding levers 17 of the ring gear 15 is located closer to the position where the balls 12a start to press the levers 17 of the ring gear 15 (a side opposite the gas generator 14 side) than the intersection Q where the imaginary straight line α extending from the cutout end portion 10h of the cutout portion 10c intersects the imaginary extension line β of the inner peripheral surface $10d_1$ of the straight portion 10k of the pipe 10 at a right angle. This can prevent the balls 12a located at the cutout portion 10c from being pressed toward the cutout portion 10c by the front and rear balls 12a. That is, the balls 12a can be restrained from deforming the portion 10i near the cutout portion 10c of the pipe 10, and the ball $12a_2$ can be restrained from coming out of the cutout portion 10c.

Therefore, energy loss of the balls 12a can be suppressed, and energy of the balls 12a can be efficiently transmitted to the stopper 16 and the levers 17 of the ring gear 15. As a result, the working amount of the pretensioner 8 can be increased.

On the other surface of the long side portion of the pipe mount portion 24 opposite the surface to which the pipe 10 is fixed, the rib 28 is provided at the position to counteract the pressing force when the outer peripheral edge portion 16c of the stopper 16 presses the ball 12a at the end of operation of the pretensioner 8. Hence, it is possible to prevent the pipe mount portion 24 from deforming when the outer peripheral edge 16c of the stopper 16 presses the ball 12a.

While the side of the pipe 10 opposing the cutout portion 10c is mounted and fixed to the pipe mount portion 24, since the pipe mount portion 24 is provided with the reinforcing portion formed by the short side portion 24b, the pipe mount portion 24 can be effectively prevented from tilting and deforming when the stopper 16 presses the pipe mount portion 24 via the pipe 10.

Other structures and other operational functions of the seatbelt retractor 3 including the pretensioner 8 of the fifth embodiment are the same as those adopted in the first embodiment.

Figure 15:
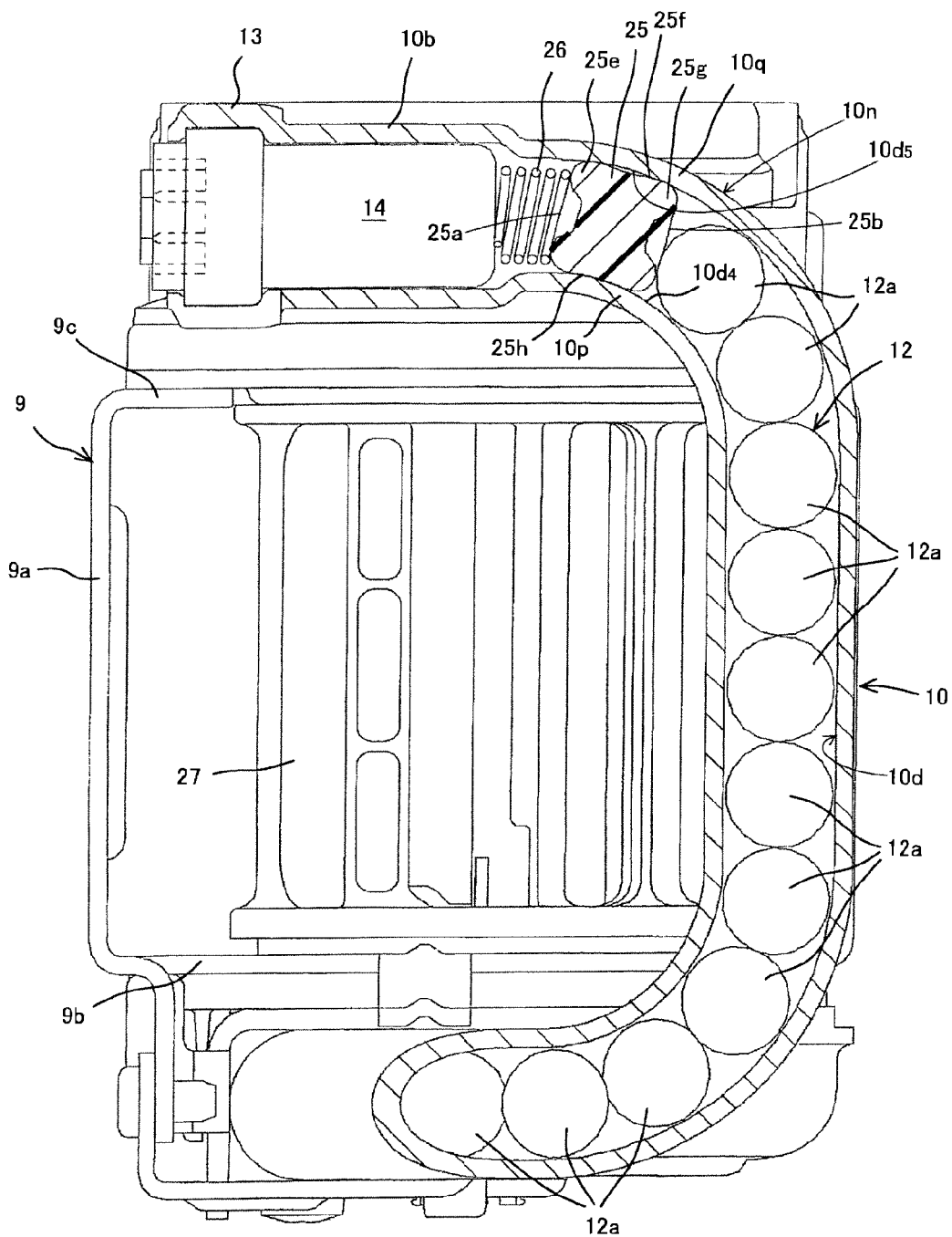
FIG. 15 is a top view of the pretensioner of the sixth embodiment, in which a pipe is partially cut away.

FIG. 14(a) is a front view of a seatbelt retractor including a pretensioner according to a sixth embodiment of the present invention, FIG. 14(b) is a left side view of the seatbelt retractor of FIG. 14(a), FIG. 14(c) is a right side view of the seatbelt retractor of FIG. 14(a), FIG. 14(d) is a top view of the seatbelt retractor of FIG. 14(a), and FIG. 15 is a top view of the pretensioner of the sixth embodiment, in which a pipe is partially cut away.

As illustrated in FIGS. 14(a) to 14(d), in the seatbelt retractor of the sixth embodiment, in a state in which a pretensioner 8 is mounted in the vehicle body, a distal end portion 10a of a pipe 10 is located at the lowest position and the pipe 10 extends straight and upward from the distal end portion 10a and is attached to one side wall 9b. In this case, the distal end portion 10a of the pipe 10 is provided with a guide member 11. The distal end portion 10a of the pipe 10 and the guide member 11 are attached to a pipe mount portion 24 fixed to one side wall 9b by appropriate fixing members such as bolts.

The pipe 10 is bent at a substantially right angle at nearly an upper end of one side wall 9b of a frame 9 and extends linearly and substantially horizontally toward the outer side of the vehicle cabin, is bent at a substantially right angle near an end of the side wall 9b opposite a base portion 9a and extends linearly and substantially horizontally in a vehicle front-rear direction, and is also bent at a substantially right angle near an end of the other side wall 9c in the vehicle front-rear direction such that a base portion 10b of the pipe 10 linearly extends toward the inner side of the vehicle cabin and slightly slopes upward from the horizontal direction. In this way, the pipe 10 is three-dimensionally piped to make the setting space compact.

As illustrated in FIG. 15, gas pressure of reaction gas generated by a gas generator 14 is received by a pressure receiving end face 25a at one end of a piston 25, and balls 12a are pressed by a pressing end face 25b at the other end of the piston 25.

In the pipe 10, a spring 26 is provided in a compressed manner between the gas generator 14 and the piston 25. In a non-operation state of the pretensioner 8, the piston 25 is biased by the biasing force of the spring 26 to press the balls 12a. This suppresses rattling of the balls 12a.

In the pretensioner 8 of the sixth embodiment, since the pipe 10 is three-dimensionally piped, as described above, the pipe 10 has a curved portion 10n provided immediately adjacent to the base end portion 10b and curved at a substantially right angle. The piston 25 is set to be located in the curved portion 10n while being biased by the spring 26 in a non-operation state of the pretensioner 8.

Figure 16:
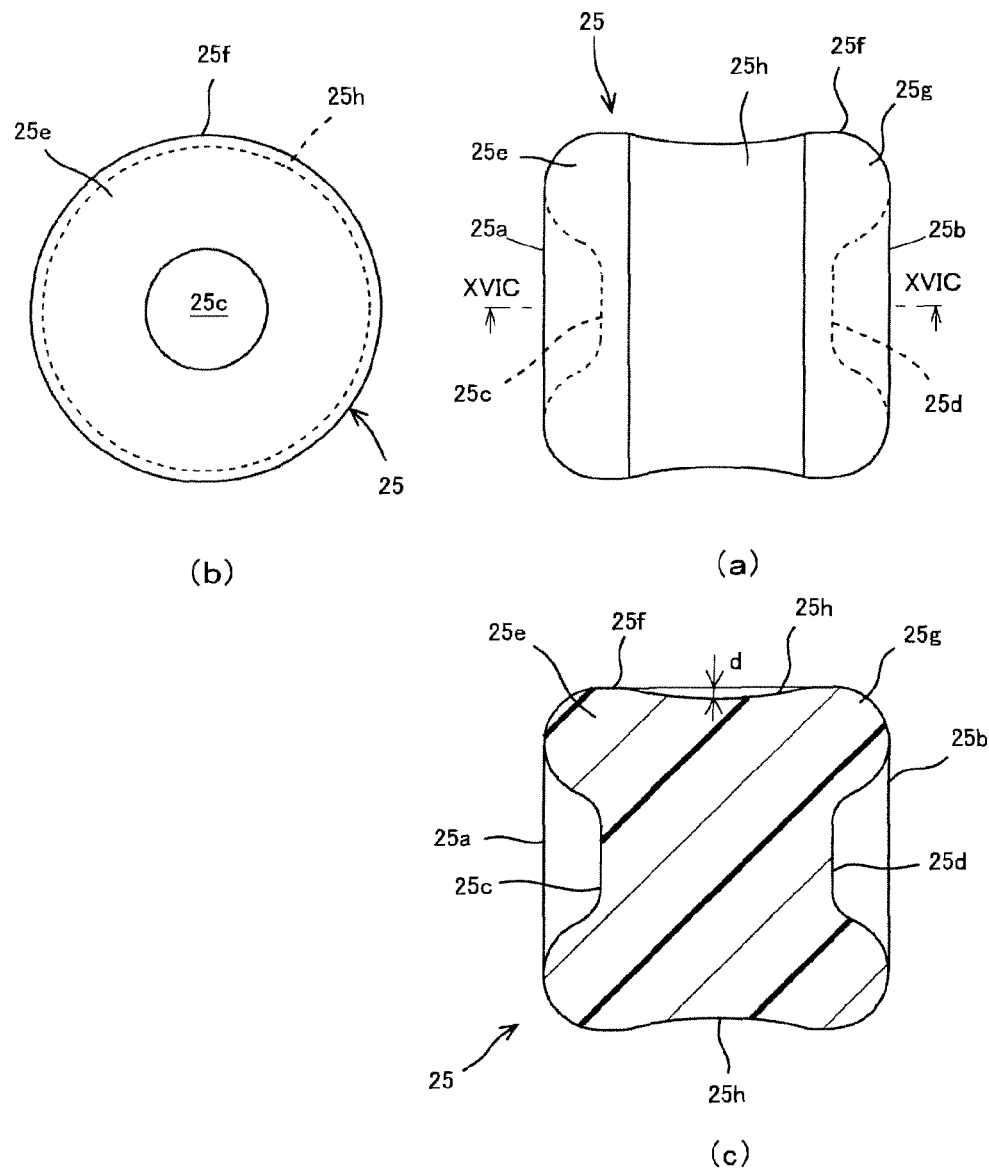
FIG. 16(a) is a front view of a piston used in the pretensioner of the sixth embodiment.
FIG. 16(b) is a left side view of the piston of FIG. 16(a)
FIG. 16(c) is a sectional view, taken along line XVIC-XVIC of FIG. 16(a).

The piston 25 is formed of resin or metal. As illustrated in FIGS. 16(a) to 16(c), the piston 25 includes a circular recess 25c and a circular recess 25d provided in the pressure receiving end face 25a and the pressing end face 25b, respectively. When the gas pressure acts on the pressure receiving end face 25a, one of the recesses, that is, the recess 25c allows an outer peripheral side face 25f of an outer peripheral edge 25e surrounding the recess 25c to be brought into close contact with the entire inner peripheral surface 10d of the pipe 10. Further, when the gas pressure acts on the pressure receiving end face 25a and the piston 25 presses the ball 12a, a part of the ball 12a enters the other recess 25d, so that an outer peripheral side face 25f of an outer peripheral edge 25g surrounding the recess 25d is brought into close contact with the inner peripheral surface 10d of the pipe 10. By such close contact of the piston 25, sealing performance between the piston 25 and the pipe 10 is enhanced.

Figure 17:
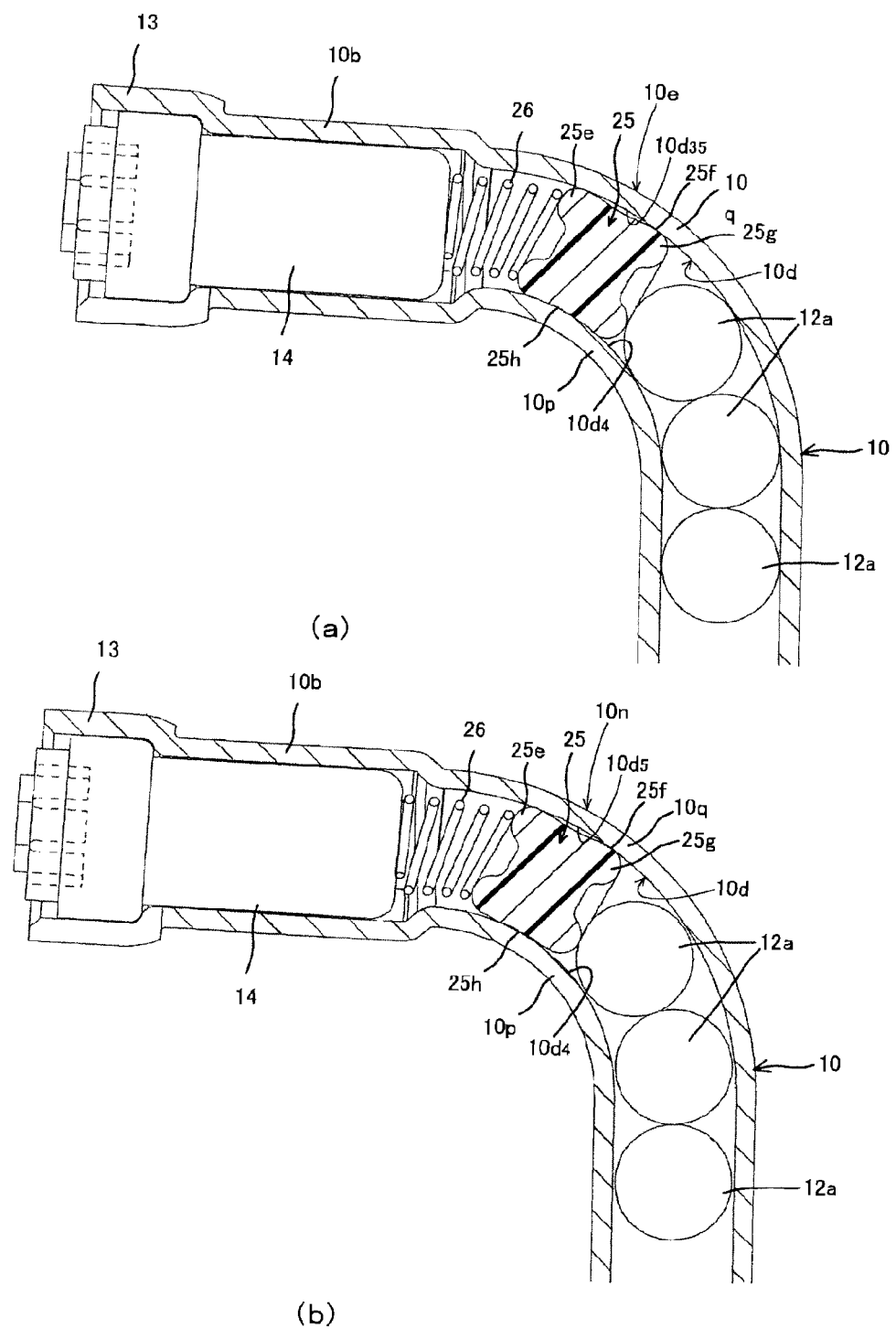
FIGS. 17(a) and 17(b) illustrate an initial set state of the piston illustrated in FIGS. 16(a) to 16(c).

A concave portion 25h that is curved in an arc form in a cross section along (toward) the axial direction of the piston 25 is provided on the entire periphery of the outer peripheral side face 25f of the piston 25. The radius of the concave portion 25h is set to be equal or substantially equal to the radius of a portion $10d_4$ of the inner peripheral surface 10d on a curved inner peripheral side 10p in the curved portion 10n of the pipe 10. Therefore, as illustrated in FIGS. 17(a) and 17(b), the concave portion 25h of the outer peripheral side face 25f of the piston 25 is in close or substantially close contact with the portion $10d_4$ of the inner peripheral surface 10d on the curved inner peripheral side 10p in the curved portion 10n of the pipe 10. In this case, when a depth d of the concave portion 25h (a length from the outer peripheral side face 25f to a bottom of the concave portion 25h; illustrated in FIG. 16(c)) is relatively large, the adhesion length in the piston axial direction between the concave portion 25h of the piston 25 and the portion $10d_4$ of the inner peripheral surface 10d on the curved inner peripheral side 10p in the curved portion 10n is set large, as illustrated in FIG. 17(a). In contrast, when the depth d of the concave portion 25h is relatively small, the adhesion length in the piston axial direction between the concave portion 25h of the piston 25 and the portion $10d_4$ of the inner peripheral surface 10d on the curved inner peripheral side 10p in the curved portion 10n is set small, as illustrated in FIG. 17(b). In this way, the adhesion amount between the concave portion 25h of the piston 25 and the portion $10d_4$ of the inner peripheral surface 10d on the curved inner peripheral side 10p in the curved portion 10n can be variously set according to the depth d of the concave portion 25h. A portion $10d_5$ of the inner peripheral surface 10d on a curved outer peripheral side 10q in the curved portion 10n of the pipe 10 is separate from the concave portion 25h of the piston 25.

Figure 18:
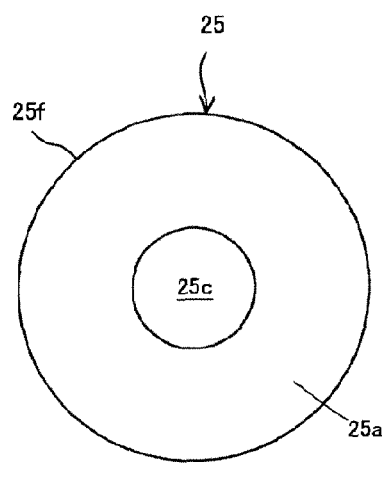
FIG. 18(a) is a front view of a piston used in a pretensioner of a comparative example.
FIG. 18(b) is a left side view of the piston of FIG. 18(a)
FIG. 18(c) is a sectional view, taken along line XVIIIC-XVIIIC of FIG. 18(a).
Figure 18:
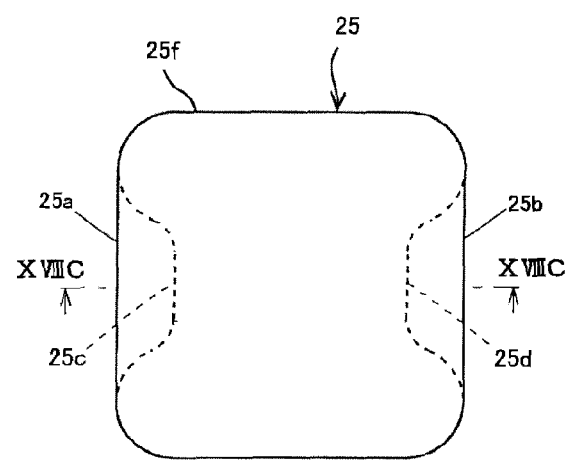
Figure 18:
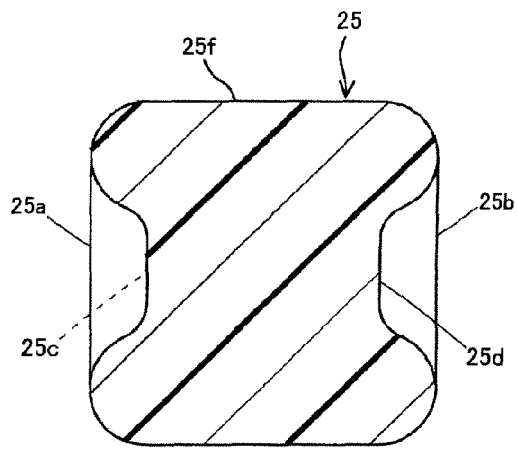

When the outer peripheral side face 25f of the piston 25 is in close or substantially close contact with the portion $10d_4$ of the inner peripheral surface 10d on the curved inner peripheral side 10p in the curved portion 10n of the pipe 10 in an initial set state of the piston 25 in a non-operation state of the pretensioner 8, even when the outer peripheral side face 25f of the piston 25 is set in the curved portion 10n of the pipe 10, the pressing force with which the outer peripheral side face 25f of the piston 25 is in press contact with the portion $10d_4$ of the inner peripheral surface 10d on the curved inner peripheral side 10p in the curved portion 10n of the pipe 10 is much smaller than in a cylindrical piston 25 as a comparative example illustrated in FIGS. 18(a) to 18(c). Thus, the slide resistance between the piston 25 and the pipe 10 becomes low. Therefore, the biasing force of the spring 26 is efficiently transmitted to the balls 12a via the piston 25, and rattling of the balls 12a is effectively suppressed in the non-operation state of the pretensioner 8.

According to the pretensioner 8 and the seatbelt retractor 3 of the sixth embodiment, since the concave portion 25h curved in an arc form is provided in the outer peripheral side face 25f of the piston 25, the concave portion 25h is in close or substantially close contact with the portion $10d_4$ of the inner peripheral surface 10d on the curved inner peripheral side 10p in the curved portion 10n of the pipe 10 in the initial set state of the piston 25. In particular, by setting the radius of the cross section of the concave portion 25h curved in the axial direction of the piston 25 to be equal or substantially equal to the radius of the portion $10d_4$ of the inner peripheral surface 10d on the curved inner peripheral side 10p in the curved portion 10n, the concave portion 25h is in close or substantially close contact with the portion $10d_4$ of the inner peripheral surface 10d on the curved inner peripheral side 10p in the curved portion 10n of the pipe 10. When the outer peripheral side face 25f of the piston 25 is thus in close or substantially close contact with the portion $10d_4$ of the inner peripheral surface 10d on the curved inner peripheral side 10p in the curved portion 10n of the pipe 10, even when the outer peripheral side face 25f of the piston 25 is set in the curved portion 10n of the pipe 10, the lap between the outer peripheral side face 25f of the piston 25 and the portion $10d_4$ of the inner peripheral surface 10d on the curved inner peripheral side 10p in the curved portion 10n of the pipe 10 can be small. Therefore, the pressing force with which the outer peripheral side face 25f of the piston 25 is in press contact with the portion $10d_4$ of the inner peripheral surface 10d on the curved inner peripheral side 10p in the curved portion 10n of the pipe 10 can be made much smaller than that of the cylindrical piston 25 that does not include the curved concave portion in the outer peripheral surface, as illustrated in FIGS. 18(a) to 18(c). Hence, the slide resistance between the piston 25 and the pipe 10 can be decreased. Thus, the biasing force of the spring 26 can be efficiently transmitted to the balls 12a via the piston 25, and rattling of the balls 12a can be effectively suppressed in a non-operation state of the pretensioner 8. As a result, rattling noise of the balls 12a can be reduced in the non-operation state of the pretensioner 8.

Further, according to a seatbelt apparatus 1 including the seatbelt retractor 3 having the pretensioner 8 of the sixth embodiment, since rattling noise of the balls 12a in the non-operation state of the pretensioner 8 can be reduced, even when the pretensioner 8 set in the vehicle cabin includes a lot of balls 12a, the occupant can comfortably stay in the vehicle cabin in a normal state (non-operation state of the pretensioner 8).

Other structures and other operational effects of the seatbelt retractor 3 including the pretensioner 8 of the sixth embodiment are the same as those adopted in the first embodiment.

The pretensioner according to the present invention is not limited to the above-described embodiments, and the above-described embodiments can be combined appropriately. Further, for example, the ring gear 15 does not need to have the arc-shaped stopper 16, and the pretensioner of the present invention can be applied to a pretensioner that does not include the arc-shaped stopper 16, such as a pretensioner described in WO 2010/084687 and a pretensioner described in Japanese Unexamined Patent Application Publication No. 2001-163182. In short, the present invention can have various design variations within the scope described in the claims.

INDUSTRIAL APPLICABILITY

The pretensioner, the seatbelt retractor, and the seatbelt apparatus of the present invention can be suitable for use in a pretensioner provided in a seatbelt retractor for retracting a seatbelt and using a plurality of force transmission members such as a plurality of balls, a seatbelt retractor, and a vehicle seatbelt apparatus.

The invention claimed is:

1. A pretensioner comprising at least:
    a pipe;
    a plurality of force transmission members provided movably in the pipe to transmit a force for rotating a spool in a seatbelt retracting direction;
    a gas generator that generates gas in case of an emergency;
    a piston that is movably provided in the pipe and pushes the force transmission members when moved by a pressure of the gas;
    a ring gear at least rotatably provided and including a plurality of internal teeth on an inner periphery and a plurality of pressed portions on an outer periphery; and
    a pinion provided in a spool-side member to rotate the spool and including external teeth to be meshed with the internal teeth,
    wherein, in case of the emergency, the force transmission members press the pressed portions of the ring gear to rotate the spool in the seatbelt retracting direction,
    wherein all of the force transmission members are balls, and
    wherein the ring gear includes a stopper that stops rotation of the ring gear by contact with at least one of the force transmission members when the ring gear is rotated by a predetermined rotation amount by being pressed by the force transmission members.

2. A pretensioner comprising:
    a pipe;
    a plurality of force transmission members provided movably in the pipe to transmit a force for rotating a spool in a seatbelt retracting direction;
    a gas generator that generates gas in case of an emergency;
    a ring gear at least rotatably provided and including a plurality of internal teeth on an inner periphery and a plurality of pressed portions on an outer periphery; and
    a pinion provided in a spool-side member to rotate the spool and including external teeth to be meshed with the internal teeth,
    wherein, in case of the emergency, the force transmission members press the pressed portions of the ring gear to rotate the spool in the seatbelt retracting direction, and wherein the ring gear includes a stopper that stops rotation of the ring gear by contact with the pipe when the ring gear is rotated by a predetermined rotation amount by being pressed by the force transmission members.

3. The pretensioner according to claim 1, wherein the pipe has a notch that allows the pressed portions of the ring gear to enter the pipe,
   the side of the pipe opposite to the notch is fitted to a pipe fitting section; and
   a reinforcement portion is fitted to the pipe fitting section to operate as reinforcement for the pipe fitting section when the ring gear is rotated by a predetermined rotation amount and the stopper contacts at least one of the force transmission members to stop the rotation of the ring tear.

4. The pretensioner according to claim 1, further comprising
   a case body; and
   a second stopper that is provided in the case body and is deformed by contact with at least one of the force transmission members or with the first one of the force transmission members before the stopper of the ring gear contacts at least one of the force transmission members.

5. A seatbelt retractor comprising at least: a seatbelt; a spool that retracts the seatbelt; and a pretensioner that rotates the spool in a seatbelt retracting direction in case of an emergency, wherein the pretensioner is the pretensioner according to claim 1.

6. A seatbelt apparatus comprising at least: a seatbelt retractor that retracts the seat belt, a tongue slidably supported by the seatbelt; and a buckle provided at the vehicle body to disengageably retain the tongue, wherein the seatbelt retractor is the seatbelt retractor according to claim 5.

7. The pretensioner according to claim 2, wherein the pipe has a notch that allows the pressed portions of the ring gear to enter the pipe,
   the side of the pipe opposite to the notch is fitted to a pipe fitting section; and
   a reinforcement portion is fitted to the pipe fitting section to operate as reinforcement for the pipe fitting section when the ring gear is rotated by a predetermined rotation amount and the stopper contacts the pipe to stop the rotation of the ring tear.

8. The pretensioner according to claim 2, further comprising
   a case body; and
   a second stopper that is provided in the case body and is deformed by contact with at least one of the force transmission members or with the first one of the force transmission members before the stopper of the ring gear contacts the pipe.

9. The pretensioner according to claim 2, wherein the force transmission members are bails.

10. A seatbelt retractor comprising at least: a seatbelt; a spool that retracts the seatbelt; and a pretensioner that rotates the spool in a seatbelt retracting direction in case of an emergency, wherein the pretensioner is the pretensioner according to claim 2.

11. A seatbelt apparatus comprising at least: a seatbelt retractor that retracts the seat belt, a tongue slidably supported by the seatbelt; and a buckle provided at the vehicle body to disengageably retain the tongue, wherein the seatbelt retractor is the seatbelt retractor according to claim 10.

* * * * *